United States Patent
Wang et al.

(10) Patent No.: US 10,002,296 B2
(45) Date of Patent: Jun. 19, 2018

(54) VIDEO CLASSIFICATION METHOD AND APPARATUS

(71) Applicant: Huawei Technologies Co., Ltd., Shenzhen (CN)

(72) Inventors: Limin Wang, Shatin (HK); Yu Qiao, Shenzhen (CN); Wei Li, Shenzhen (CN); Chunjing Xu, Shenzhen (CN); Xiaoou Tang, Shatin (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 15/167,388

(22) Filed: May 27, 2016

(65) Prior Publication Data
US 2016/0275355 A1    Sep. 22, 2016

Related U.S. Application Data

(63) Continuation of application No. PCT/CN2014/075510, filed on Apr. 16, 2014.

(30) Foreign Application Priority Data

Nov. 29, 2013    (CN) .......................... 2013 1 0631901

(51) Int. Cl.
*G06K 9/00* (2006.01)
*G06F 17/30* (2006.01)
*G06K 9/62* (2006.01)

(52) U.S. Cl.
CPC ... *G06K 9/00718* (2013.01); *G06F 17/30781* (2013.01); *G06F 17/30784* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 6,965,645 B2* | 11/2005 | Zhang | ................ | G06K 9/00711 348/E5.065 |
| 7,302,004 B2* | 11/2007 | Zhang | ................ | G06K 9/00711 348/E5.065 |

(Continued)

FOREIGN PATENT DOCUMENTS

| | | |
|---|---|---|
| CN | 101894276 A | 11/2010 |
| CN | 102034096 A | 4/2011 |

(Continued)

OTHER PUBLICATIONS

Cortes, C. et al., "Support-Vector Networks," Machine Learning, 20, 1995, 25 pages.

(Continued)

*Primary Examiner* — Anand Bhatnagar
(74) *Attorney, Agent, or Firm* — Slater Matsil, LLP

(57) ABSTRACT

A video classification method and apparatus relate to the field of electronic and information technologies, so that precision of video classification can be improved. The method includes: segmenting a video in a sample video library according to a time sequence, to obtain a segmentation result, and generating a motion atom set; generating, by using the motion atom set and the segmentation result, a motion phrase set that can indicate a complex motion pattern, and generating a descriptive vector, based on the motion phrase set, of the video in the sample video library; and determining, by using the descriptive vector, a to-be-detected video whose category is the same as that of the video in the sample video library. The method is applicable to a scenario of video classification.

20 Claims, 13 Drawing Sheets

(52) U.S. Cl.
CPC .... *G06F 17/30811* (2013.01); *G06K 9/00724* (2013.01); *G06K 9/00744* (2013.01); *G06K 9/00758* (2013.01); *G06K 9/00765* (2013.01); *G06K 9/6218* (2013.01)

(56) References Cited

U.S. PATENT DOCUMENTS

| | | | | |
|---|---|---|---|---|
| 7,609,761 | B2* | 10/2009 | Lim | G06F 17/30805 375/240.08 |
| 8,135,221 | B2* | 3/2012 | Jiang | G10L 25/00 382/224 |
| 8,620,971 | B2* | 12/2013 | Tanaka | G06F 17/30017 707/809 |
| 8,699,852 | B2* | 4/2014 | Jiang | H04N 21/2743 386/241 |
| 8,867,891 | B2* | 10/2014 | Jiang | H04N 5/93 386/241 |
| 9,158,974 | B1* | 10/2015 | Laska | G06T 7/246 |
| 9,715,641 | B1* | 7/2017 | Kwatra | G06K 9/6256 |
| 2005/0147170 | A1* | 7/2005 | Zhang | G06K 9/00711 375/240.16 |
| 2007/0162924 | A1 | 7/2007 | Radhakrishnan et al. | |
| 2007/0255755 | A1 | 11/2007 | Zhang et al. | |
| 2011/0081082 | A1* | 4/2011 | Jiang | G06K 9/00765 382/170 |
| 2016/0093338 | A1* | 3/2016 | Laska | G06K 9/00711 386/224 |

FOREIGN PATENT DOCUMENTS

| | | |
|---|---|---|
| CN | 102663409 A | 9/2012 |
| CN | 102682302 A | 9/2012 |
| CN | 103164694 A | 6/2013 |
| CN | 103177091 A | 6/2013 |

OTHER PUBLICATIONS

"Dense Trajectories and Motion Boundary Descriptors for Action Recognition," Research Gate, Article in International Journal of Computer Vision, May 2013, 21 pages.

Dollar, D. et al., "Behavior Recognition via Sparse Spatio-Temporal Features," 2nd Joint IEEE International Workshop on Visual Surveillance and Performance Evaluation of Tracking and Surveillance, 2005, 8 pages.

Frey, B.J., et al., "Clustering by Passing Messages Between Data Points," downloaded from www.sciencemag.org on Feb. 15, 2007, Published in Science Magazine, 2007, 23 pages.

Jain, A. et al., "Representing Videos using Mid-Level Discriminitive Patches," 2013 IEEE Conference on Computer Vision and Pattern Recognition, 2013, 8 pages.

Klaser, A. et al., "A Spatio-Temporal Descriptor Based on 3D-Gradients," BMVC'08, Sep. 2008, 10 pages.

Laptev, I. et al., "Learning Realistic Human Actions from Movies," Computer Vision and Pattern Recognition, 2008, 8 pages.

Laptev, I. et al., "On Space-Time Interest Points," International Journal of Computer Vision 64 (2/3), 2005, 17 pages.

Liu, J. et al., "Recognizing Human Actions by Attributes," Department of Electrical Engineering and Computer Science, University of Michigan, 2011, 8 pages.

Malgireddy, M.R. et al., "Language-Motivated Approaches to Action Recognition," Journal of Machine Learning Research 14, 2013, 24 pages.

Niebles, J.C. et al., "Modeling Temporal Structure of Decomposable Motion Segments for Activity Classification," European Conference on Computer Vision, 2010, 14 pages.

Tang, K. et al., "Learning Latent Temporal Structure for Complex Event Detection," Computer Vision and Pattern Recognition, 2012, 8 pages.

Wang, L. et al., "Mining Motion Atoms and Phrases for Complex Action Recognition," 2013 IEEE International Conference on Computer Vision, 2013, 8 pages.

Wang, L. et al., "Motionlets: Mid-Level 3D Parts for Human Motion Recognition," 2013 IEEE Conference on Computer Vision and Pattern Recognition, 2013, 8 pages.

* cited by examiner

VIDEO CLASSIFICATION METHOD AND APPARATUS

CROSS-REFERENCE TO RELATED APPLICATIONS

This application is a continuation of International Application No. PCT/CN2014/075510, filed on Apr. 16, 2014, which claims priority to Chinese Patent Application No. 201310631901.6, filed on Nov. 29, 2013, both of which are hereby incorporated by reference in their entireties.

TECHNICAL FIELD

The present invention relates to the field of electronic and information technologies, and in particular, to a video classification method and apparatus.

BACKGROUND

As video data increases massively, a user needs to consume a large amount of time and energy to browse videos one by one and classify videos according to motion information of human figures in the videos. Although currently videos can already be classified according to some simple motions such as walking and running in the videos, motions in videos such as sports are usually complex, and video classification according to simple motions already cannot satisfy user requirements. To enable videos to be classified according to relatively complex and continuous motions in the videos, in the prior art, features such as histogram of oriented gradients (HOG) in some local areas are extracted from the videos, clustering is performed according to these features to form motion atoms, where the motion atoms are simple motion patterns having some similarities, responses between to-be-detected videos and these motion atoms are then calculated, obtained responses are used to form a vector, and the to-be-detected videos are classified according to the obtained vector.

However, complex motions having a strong time sequence relationship always appear in videos, and when to-be-detected videos are classified by using a vector obtained by using motion atoms, it is difficult to ensure classification precision. Therefore, in the prior art, another method is used. Complex motions in videos are divided by time into some fragments including simple motions, where each fragment corresponds to a time point. During classification, each fragment and a fragment obtained by dividing a sample are compared according to a time sequence, to obtain a comparison score of each fragment. A weighted sum of these comparison scores is calculated to obtain a final comparison score. The videos are classified according to the final comparison score.

However, for complex motions that are quite continuous and that last for a long time, in the prior art, it is very difficult to properly divide these complex motions into fragments including simple motions. In addition, when time points at which complex motions in videos are divided are set differently, comparison scores obtained after performing comparison with fragments obtained by dividing samples are also different. As a result, multiple different results are generated in video classification, it is difficult to unify different results, and precision of video classification is also relatively low.

SUMMARY

Embodiments of the present invention provide a video classification method and apparatus, which can improve precision of video classification.

To achieve the foregoing objective, the following technical solutions are used in the embodiments of the present invention.

According to a first aspect, an embodiment of the present invention provides a video classification method, including: segmenting a video in a sample video library according to a time sequence, to obtain a segmentation result, and generating a motion atom set, where the sample video library includes at least one video, and a motion atom in the motion atom set is generated according to the video in the sample video library; generating, by using the motion atom set and the segmentation result, a descriptive vector corresponding to the video in the sample video library; and determining, by using the descriptive vector, a to-be-detected video whose category is the same as that of the video in the sample video library.

With reference to the first aspect, in a first possible implementation manner, the generating, by using the motion atom set and the segmentation result, a descriptive vector corresponding to the video in the sample video library includes: generating, according to the motion atom set and the segmentation result, a motion phrase set corresponding to the video in the sample video library, where the motion phrase set includes at least two motion phrases, and a motion phrase includes motion atoms that occur in a sequence near time points; screening the motion phrases and obtaining a screening result; and generating, according to the screening result, the descriptive vector corresponding to the video in the sample video library.

With reference to the first aspect and the first possible implementation manner of the first aspect, in a second possible implementation manner, the sample video library includes at least two videos, and the videos in the sample video library are in a same category.

With reference to the second possible implementation manner of the first aspect, in a third possible implementation manner, the method further includes: acquiring a motion atom unit $\pi(A,t,\sigma)$, and acquiring a representativeness parameter $Rep(P_1,c)$ of a motion phrase according to the motion atom unit.

$$Rep(P_1, c) = \frac{\sum_{i \in S(P_1, c)} r(V, P_1)}{|S(P_1, c)|},$$

A is a motion atom, t is a time point in a video in the sample video library, $\sigma$ is a standard deviation of Gaussian distribution, V is a video in the sample video library, $P_1$ is the motion phrase, $r(V,P_1)$ is a response of the motion phrase $P_1$ with respect to the video in the sample video library, $$r(V, P_1) = \min_{OR_i \in P_1} \max_{\pi \in OR_i} v(V, \pi),$$

$$v(V, \pi) = \max_{t' \in \Omega(t)} \text{Score}(\Phi(V, t'), A) \cdot N(t' \mid t, \sigma),$$

$OR_i$ refers to calculation of responses between the video in the sample video library and the motion atom units that are adjacent in time, $S(P_1,c)$ denotes a set of videos, with respect to which a motion phrase has the greatest response, in the sample video library, c is an identifier of a category of a video in the sample video library, $\Phi(V,t')$ denotes a video feature of a segment result that is in a video in the sample video library and that starts from t', Score $(\Phi(V,t'),A)$ denotes a score obtained by inputting $\Phi(V,t')$ into a support vector machine SVM classifier, $N(t'|t,\sigma)$ denotes Gaussian distribution with a mean t and a standard deviation $\sigma$, and $\Omega(t)$ denotes an adjacent area with a center t. The method also includes acquiring a coverage parameter $RepSet(\Gamma_1^c,c)$ of the motion phrase, and obtaining, according to the coverage parameter $RepSet(\Gamma_1^c,c)$ of the motion phrase, a contribution value $\Delta RepSet(P_1,c)$, which contributes to the coverage parameter, of the motion phrase, where $$RepSet(\Gamma_1^c, c) = \frac{1}{T_c}\left|\bigcup_{P_1 \in \Gamma} S(P_1, c)\right|,$$

$$\Delta RepSet(P_1, c) = RepSet(\Gamma_1^c, c) - RepSet(\Gamma_1^c - \{P_1\}, c),$$

$T_c$ is a quantity of segments obtained by segmenting a video whose identifier is c and that is in the sample video library, $\Gamma_1^c$ is the motion phrase set, and an identifier of a category of a video to which the motion atom included in the motion phrase belongs is c. The foregoing process is performed for each motion phrase in the motion phrase set, and obtaining a representativeness parameter and a contribution value of each motion phrase in the motion phrase set.

The screening the motion phrases and obtaining a screening result includes: sorting the motion phrases in the motion phrase set in descending order of values of $Rep(P_1,c)+\Delta RepSet(P_1,c)$ according to a representativeness parameter and a contribution value of each motion phrase in the motion phrase set, and using first $m_1$ motion phrases as a first screening result, where $m_1$ is a positive integer greater than or equal to 1; extracting one motion atom from the motion atom set to add the motion atom to the motion phrases in the first screening result, so that a motion phrase in the first screening result has two motion atoms; repeating the foregoing process until an $(n-1)^{th}$ screening result is obtained, extracting one motion atom from the motion atom set to add the motion atom to motion phrases in the $(n-1)^{th}$ screening result, so that a motion phrase in the $(n-1)^{th}$ screening result has n motion atoms, and obtaining an $n^{th}$ screening result according to the motion phrases in the $(n-1)^{th}$ screening result, where the $n^{th}$ screening result is first $m_n$ motion phrases arranged in descending order of values of $Rep(P_n, c)+\Delta RepSet(P_1,c)$, where $m_n$ is a positive integer greater than or equal to 1, a motion phrase in the $n^{th}$ screening result has n motion atoms, and n is a positive integer greater than or equal to 1; and generating the descriptive vector according to the first to $n^{th}$ screening results.

With reference to the third possible implementation manner of the first aspect, in a fourth possible implementation manner, the sample video library includes at least two videos, and the sample video library includes videos in at least two categories, where the generating, according to the screening result, the descriptive vector corresponding to the video in the sample video library includes: obtaining a screening result set according to screening results of the motion phrases corresponding to the videos in the different categories in the sample video library; and generating, according to the screening result set, the descriptive vector corresponding to the videos in the sample video library.

With reference to the fourth possible implementation manner of the first aspect, in a fifth possible implementation manner, the determining, by using the descriptive vector, a to-be-detected video whose category is the same as that of the video in the sample video library includes: generating a response vector corresponding to the to-be-detected video; acquiring the descriptive vector corresponding to a video in each different category in the sample video library, and obtaining a first classification rule according to the descriptive vector, where the first classification rule is used to determine the category to which the to-be-detected video belongs; and determining, according to the first classification rule and the response vector, that the category of the to-be-detected video is the same as a category of the categories of the videos included in the sample video library, and classifying the to-be-detected video.

With reference to the first aspect and the second possible implementation manner of the first aspect, in a sixth possible implementation manner, the determining, by using the descriptive vector, a to-be-detected video whose category is the same as that of the video in the sample video library includes: generating a response vector corresponding to the to-be-detected video; obtaining a second classification rule according to a descriptive vector corresponding to each video in the sample video library, where the second classification rule is used to detect whether the category of the to-be-detected video is the same as that of the video in the sample video library; detecting whether the response vector of the to-be-detected video conforms to the second classification rule; and if the response vector of the to-be-detected video conforms to the second classification rule, determining that the category of the to-be-detected video is the same as that of the video in the sample video library.

With reference to the first aspect, in a seventh possible implementation manner, the method further includes: acquiring at least one component in a response vector of the to-be-detected video, and obtaining a main motion phrase according to the at least one component, where the main motion phrase is a motion phrase corresponding to at least one component; and acquiring and displaying a key frame of the to-be-detected video, where the key frame has the greatest response to each motion atom unit in the main motion phrase.

According to a second aspect, an embodiment of the present invention provides a video classification apparatus, including: a first generation module, configured to segment a video in a sample video library according to a time sequence, to obtain a segmentation result, and generate a motion atom set, where the sample video library includes at least one video, and a motion atom in the motion atom set is generated according to the video in the sample video library; a second generation module, configured to generate, by using the motion atom set and the segmentation result, a descriptive vector corresponding to the video in the sample video library; and a classification module, configured to determine, by using the descriptive vector, a to-be-detected video whose category is the same as that of the video in the sample video library.

With reference to the second aspect, in a first possible implementation manner, the second generation module includes: a first generation unit, configured to generate, according to the motion atom set and the segmentation result, a motion phrase set corresponding to the video in the sample video library, where the motion phrase set includes at least two motion phrases, and a motion phrase includes motion atoms that occur in a sequence near time points; a screening unit, configured to screen the motion phrases and obtain a screening result; and a second generation unit, configured to generate, according to the screening result, the descriptive vector corresponding to the video in the sample video library.

With reference to the second aspect and the first possible implementation manner of the second aspect, in a second possible implementation manner, the sample video library includes at least two videos, and the videos in the sample video library are in a same category.

With reference to the second possible implementation manner of the second aspect, in a third possible implementation manner, a motion phrase in the motion phrase set includes one motion atom in the motion atom set, and the second generation module further includes: a first acquiring unit, configured to acquire a motion atom unit $\pi(A,t,\sigma)$, and acquire a representativeness parameter $Rep(P_1,c)$ of a motion phrase according to the motion atom unit.

$$Rep(P_1, c) = \frac{\sum_{i \in S(P_1,c)} r(V, P_1)}{|S(P_1, c)|},$$

A is a motion atom, t is a time point in a video in the sample video library, $\sigma$ is a standard deviation of Gaussian distribution, V is a video in the sample video library, $P_1$ is the motion phrase, $r(V,P_1)$ is a response of the motion phrase $P_1$ with respect to the video in the sample video library, $$r(V, P_1) = \min_{OR_i \in P_1} \max_{\pi \in OR_i} v(V, \pi),$$

$$v(V, \pi) = \max_{t' \in \Omega(t)} \text{Score}(\Phi(V, t'), A) \cdot N(t' \mid t, \sigma),$$

$OR_i$ refers to calculation of responses between the video in the sample video library and the motion atom units that are adjacent in time, $S(P_1,c)$ denotes a set of videos, with respect to which a motion phrase has the greatest response, in the sample video library, c is an identifier of a category of a video in the sample video library, $\Phi(V,t')$ denotes a video feature of a segment result that is in a video in the sample video library and that starts from t', $\text{Score}(\Phi(V,t'),A)$ denotes a score obtained by inputting $\Phi(V,t')$ into a support vector machine SVM classifier, $N(t'|t,\sigma)$ denotes Gaussian distribution with a mean t and a standard deviation $\sigma$, and $\Omega(t)$ denotes an adjacent area with a center t. A second acquiring unit is configured to acquire a coverage parameter $RepSet(\Gamma_1^c,c)$ of the motion phrase, and obtain, according to the coverage parameter $RepSet(\Gamma_1^c,c)$ of the motion phrase, a contribution value $\Delta RepSet(P_1,c)$, which contributes to the coverage parameter, of the motion phrase, where $$RepSet(\Gamma_1^c, c) = \frac{1}{T_c}\left|\bigcup_{P_1 \in \Gamma} S(P_1, c)\right|,$$

$$\Delta RepSet(P_1, c) = RepSet(\Gamma_1^c, c) - RepSet(\Gamma_1^c - \{P_1\}, c),$$

$T_c$ is a quantity of segments obtained by segmenting a video whose identifier is c and that is in the sample video library, $\Gamma_1^c$ is the motion phrase set, and an identifier of a category of a video to which the motion atom included in the motion phrase belongs is c. The foregoing process is performed for each motion phrase in the motion phrase set, and a representativeness parameter and a contribution value of each motion phrase in the motion phrase set are obtained. The screening unit includes a screening subunit, configured to sort the motion phrases in the motion phrase set in descending order of values of $Rep(P_1,c)+\Delta RepSet(P_1,c)$ according to a representativeness parameter and a contribution value of each motion phrase in the motion phrase set, and use first $m_1$ motion phrases as a first screening result, where $m_1$ is a positive integer greater than or equal to 1; and an adding subunit, configured to extract one motion atom from the motion atom set to add the motion atom to the motion phrases in the first screening result, so that a motion phrase in the first screening result has two motion atoms. The screening subunit and the adding subunit are continuously executed until an $(n-1)^{th}$ screening result is obtained, one motion atom is extracted from the motion atom set to add the motion atom to motion phrases in the $(n-1)^{th}$ screening result, so that a motion phrase in the $(n-1)^{th}$ screening result has n motion atoms, and an $n^{th}$ screening result is obtained according to the motion phrases in the $(n-1)^{th}$ screening result, where the $n^{th}$ screening result is first $m_n$ motion phrases arranged in descending order of values of $Rep(P_n, c)+\Delta RepSet(P_n,c)$, where $m_n$ is a positive integer greater than or equal to 1, a motion phrase in the $n^{th}$ screening result has n motion atoms, and n is a positive integer greater than or equal to 1. A first generation subunit is configured to generate the descriptive vector according to the first to $n^{th}$ screening results.

With reference to the third possible implementation manner of the second aspect, in a fourth possible implementation manner, the sample video library includes at least two videos, and the sample video library includes videos in at least two categories. The second generation unit includes: a set subunit, configured to obtain a screening result set according to screening results of the motion phrases corresponding to the videos in the different categories in the sample video library; and a second generation subunit, configured to generate, according to the screening result set, the descriptive vector corresponding to the videos in the sample video library.

With reference to the fourth possible implementation manner of the second aspect, in a fifth possible implementation manner, the classification module includes: a third generation unit, configured to generate a response vector corresponding to the to-be-detected video; a third acquiring unit, configured to acquire the descriptive vector corresponding to a video in each different category in the sample video library, and obtain a first classification rule according to the descriptive vector, where the first classification rule is used to determine the category to which the to-be-detected video belongs; and a first classification unit, configured to determine, according to the first classification rule and the response vector, that the category of the to-be-detected video is the same as a category of the categories of the videos included in the sample video library, and classify the to-be-detected video.

With reference to the second aspect and the second possible implementation manner of the second aspect, in a sixth possible implementation manner, the classification module includes: a fourth generation unit, configured to generate a response vector corresponding to the to-be-detected video; a fourth acquiring unit, configured to obtain a second classification rule according to a descriptive vector corresponding to each video in the sample video library, where the second classification rule is used to detect whether the category of the to-be-detected video is the same as that of the video in the sample video library; a detection unit, configured to detect whether the response vector of the to-be-detected video conforms to the second classification rule; and a second classification unit, configured to: when the response vector of the to-be-detected video conforms to the second classification rule, determine that the category of the to-be-detected video is the same as that of the video in the sample video library.

With reference to the second aspect, in a seventh possible implementation manner, the apparatus further includes: an acquiring module, configured to acquire at least one component in a response vector of the to-be-detected video, and obtain a main motion phrase according to the at least one component, where the main motion phrase is a motion phrase corresponding to at least one component; and a display module, configured to acquire and display a key frame of the to-be-detected video, where the key frame has the greatest response to each motion atom unit in the main motion phrase.

In the video classification method and apparatus provided in the embodiments of the present invention, a video in a sample video library can be segmented to generate motion atoms, a descriptive vector of the video in the sample video library is generated by using a segmentation result and the motion atoms, and a to-be-detected video whose category is the same as that of the video in the sample video library is determined by using the descriptive vector, thereby achieving an objective of video classification. However, as shown in FIG. 1a, in a solution of obtaining a corresponding vector of a to-be-detected video according to a motion atom in the prior art, because a time factor is not included in a motion atom, a time sequence relationship between motion atoms of a continuous and complex motion cannot be indicated. However, in the present invention, a motion phrase is generated according to motion atoms, and a descriptive vector is further generated according to the motion phrase, where the motion phrase includes motion atoms that occur in a sequence near time points, and is used to describe a time sequence relationship between motion atoms of a continuous and complex motion. For example, a to-be-detected video is classified by using an SVM classifier. The solution in the present invention is shown in FIG. 1b. In the solution of dividing a video into simple segments according to time in the prior art, because time points for division into segments are set and selected differently, a video classification result is also different; therefore, it is difficult to properly divide a continuous and complex motion into segments including simple motions, and a classification result is not precise. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and a descriptive vector is generated according to the motion phrase. In this way, a video including a long-time continuous and complex motion can be accurately classified.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1A:
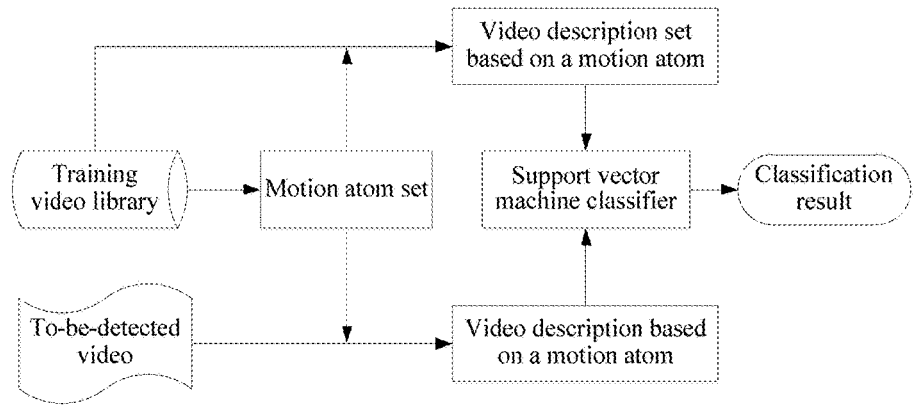
FIG. 1a is a flowchart of an example of a video classification method in the prior art.

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the technical solutions provided in the embodiments of the present invention, a motion atom set can be generated according to motion information in a to-be-detected video, a descriptive vector of a video in a sample video library is finally obtained, and the descriptive vector is used to classify the to-be-detected video. In an actual application, in this solution, to-be-detected videos may be roughly classified into broad categories such as music videos, sports videos, and dance videos, and to-be-detected videos may also be specifically classified into subcategories such as sprint videos, high jump videos, and long jump videos.

An embodiment of the present invention provides a video classification method. As shown in FIG. 1c, the method includes the following steps:

101. Segment a video in a sample video library according to a time sequence, to obtain a segmentation result, and generate a motion atom set.

The video in the sample video library may be selected according to a classification requirement of a user. For example, a user intends to classify to-be-detected videos into three categories: dance videos, straight play videos, and sports videos, and in this case, videos in these three categories, that is, dance videos, straight play videos, and sports videos may be selected and placed in the sample video library as videos in the sample video library. For another example, a user intends to classify to-be-detected sports videos into three subcategories: high jump videos, swimming videos, and gymnastics videos, and in this case, videos in these three subcategories, that is, high jump videos, swimming videos, and gymnastics videos may be selected and placed in the sample video library as videos in the sample video library.

The sample video library includes at least one video, and a motion atom in the motion atom set is generated according to the video in the sample video library. A system divides each video in the sample video library into video segments having an equal length, and a particular overlapped time exists between neighboring video segments, for example, a video segment 1 is a 00:00:00-00:01:00 segment in a video, and a neighboring video segment 2 of the video segment 1 is a 00:00:30-0000:01:30 segment in the video. The system extracts a low-level video feature for each video segment, where the low-level video feature may be a HOG (Histogram of Oriented Gradients, histogram of oriented gradients) feature, a dense trajectory feature, or the like, to obtain a low-level video feature set. The low-level video feature set may be indicated as $\zeta=\{h_i\}_{i=1}^{N \times k}$, where N is a quantity of videos in the sample video library, k is a quantity of video segments obtained by dividing each video, $h_i$ is a d-dimensional vector, and d depends on a specific low-level video feature. A similarity degree parameter $Sim(h_i, h_j)$ of a low-level video feature is obtained according to a formula $$Sim(h_i, h_j) = \exp\left(-\frac{1}{2\mu}\sum_{K=1}^{d} \frac{(h_i^K - h_j^K)^2}{h_i^K + h_j^K}\right),$$

where $\mu$ is a mean value of Euclidean distances between all vectors, and $h_i^K$ denotes a $K^{th}$-dimensional vector of $h_i$. The system then forms a motion atom according to a similarity degree parameter of a low-level video feature by using a clustering algorithm, where the clustering algorithm may be an affinity propagation algorithm or the like; and obtains the motion atom set by using motion atoms.

102. Generate, by using the motion atom set and the segmentation result, a descriptive vector corresponding to the video in the sample video library.

Motion atoms in the motion atom set occur in a time sequence, and may form a motion phrase, a response is calculated by using the motion phrase and a video in the sample video library, and obtained response values are used to form the descriptive vector of the video in the sample video library, thereby achieving an objective of quantizing video content.

103. Determine, by using the descriptive vector, a to-be-detected video whose category is the same as that of the video in the sample video library.

A video classification rule may be formed by using the descriptive vector of the video in the sample video library, and a video whose category is the same as that of a to-be-detected video is determined in the sample video library, to classify the to-be-detected video.

In the video classification method provided in this embodiment of the present invention, a video in a sample video library can be segmented to generate motion atoms, a descriptive vector of the video in the sample video library is generated by using a segmentation result and the motion atoms, and a to-be-detected video whose category is the same as that of the video in the sample video library is determined by using the descriptive vector, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and a descriptive vector is generated according to the motion phrase. In this way, a video including a long-time continuous and complex motion can be accurately classified.

Figure 1B:
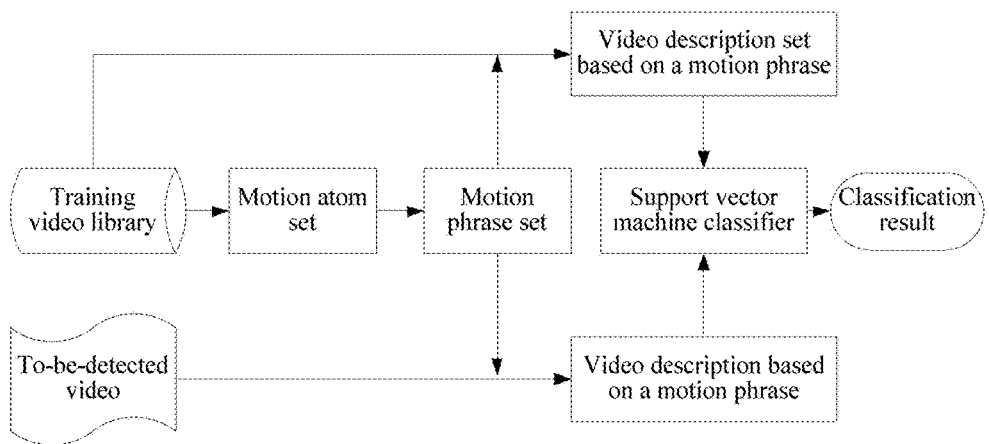
FIG. 1b is a flowchart of an example of a video classification method according to the present invention.
Figure 1C:
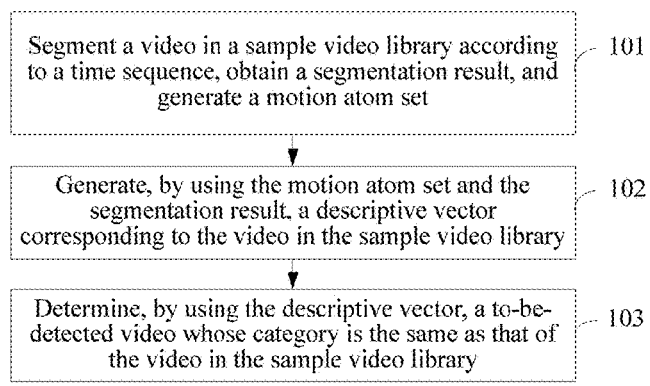
FIG. 1c is a flowchart of a video classification method according to an embodiment of the present invention.
Figure 2:
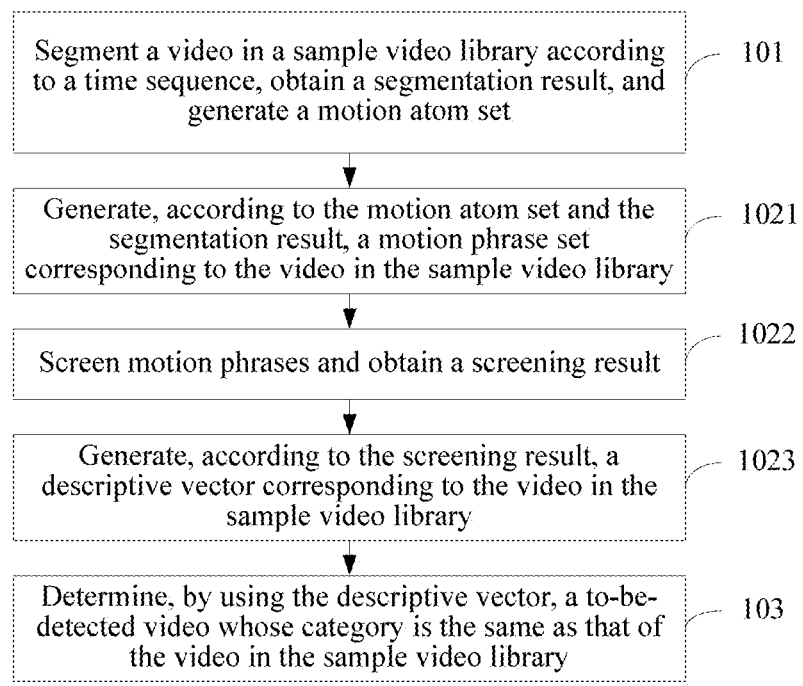
FIG. 2 is a flowchart of a specific implementation manner of a video classification method according to an embodiment of the present invention.

Optionally, based on the solution shown in FIG. 1, an embodiment of the present invention further provides a specific solution of a video classification method, and describes in further detail a process of performing step 102 in FIG. 1. Step 102 may be specifically implemented in steps 1021 to 1023, and as shown in FIG. 2, step 102 includes:

1021. Generate, according to the motion atom set and the segmentation result, a motion phrase set corresponding to the video in the sample video library.

The motion phrase set includes at least two motion phrases, and a motion phrase includes motion atoms that occur in a sequence near time points. The motion phrase may indicate a time sequence relationship between motion atoms.

1022. Screen motion phrases and obtain a screening result.

If there are in total M motion atoms in the motion atom set, and each video in the sample video library is divided into k segments, $2^{M \times k}$ motion phrases may be generated. A large number of motion phrases result in that a calculation amount in a classification process increases, and in this case, a motion phrase that has desirable representativeness, coverage, and distinguishability is screened out as a screening result, to perform a subsequent procedure.

1023. Generate, according to the screening result, a descriptive vector corresponding to the video in the sample video library.

A response is calculated by using the motion phrase in the screening result and a video in the sample video library, and obtained response values are used to form the descriptive vector of the video in the sample video library, thereby achieving an objective of quantizing video content.

In the video classification method provided in this embodiment of the present invention, a video in a sample video library can be segmented to generate motion atoms, motion phrases of the video in the sample video library are generated by using a segmentation result and the motion atoms, the motion phrases are screened and a descriptive vector is generated according to a screening result, and a to-be-detected video whose category is the same as that of the video in the sample video library is determined by using the descriptive vector, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened. A motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified.

Figure 3A:
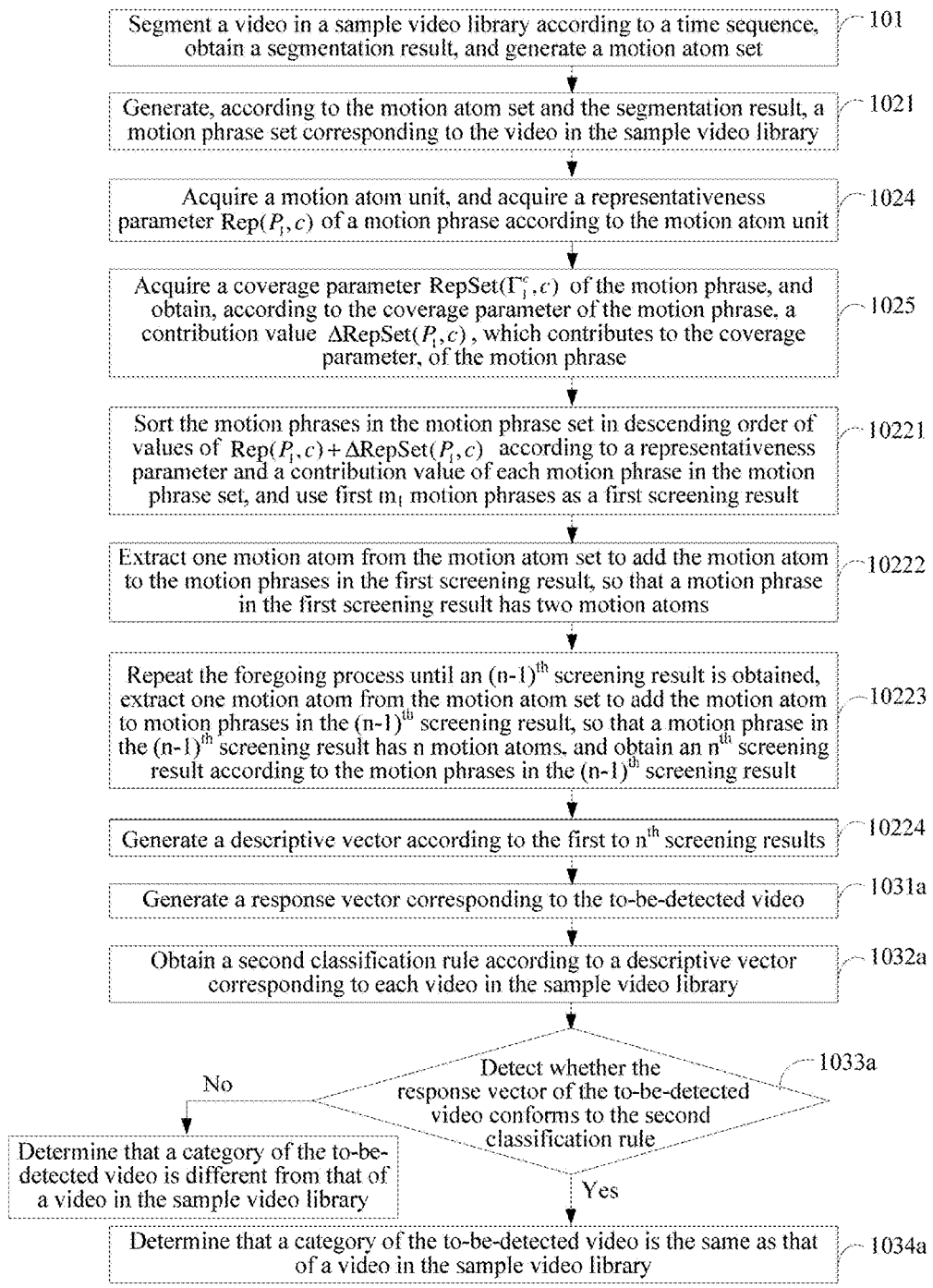
FIG. 3a is a flowchart of another specific implementation manner of a video classification method according to an embodiment of the present invention.
Figure 3B:
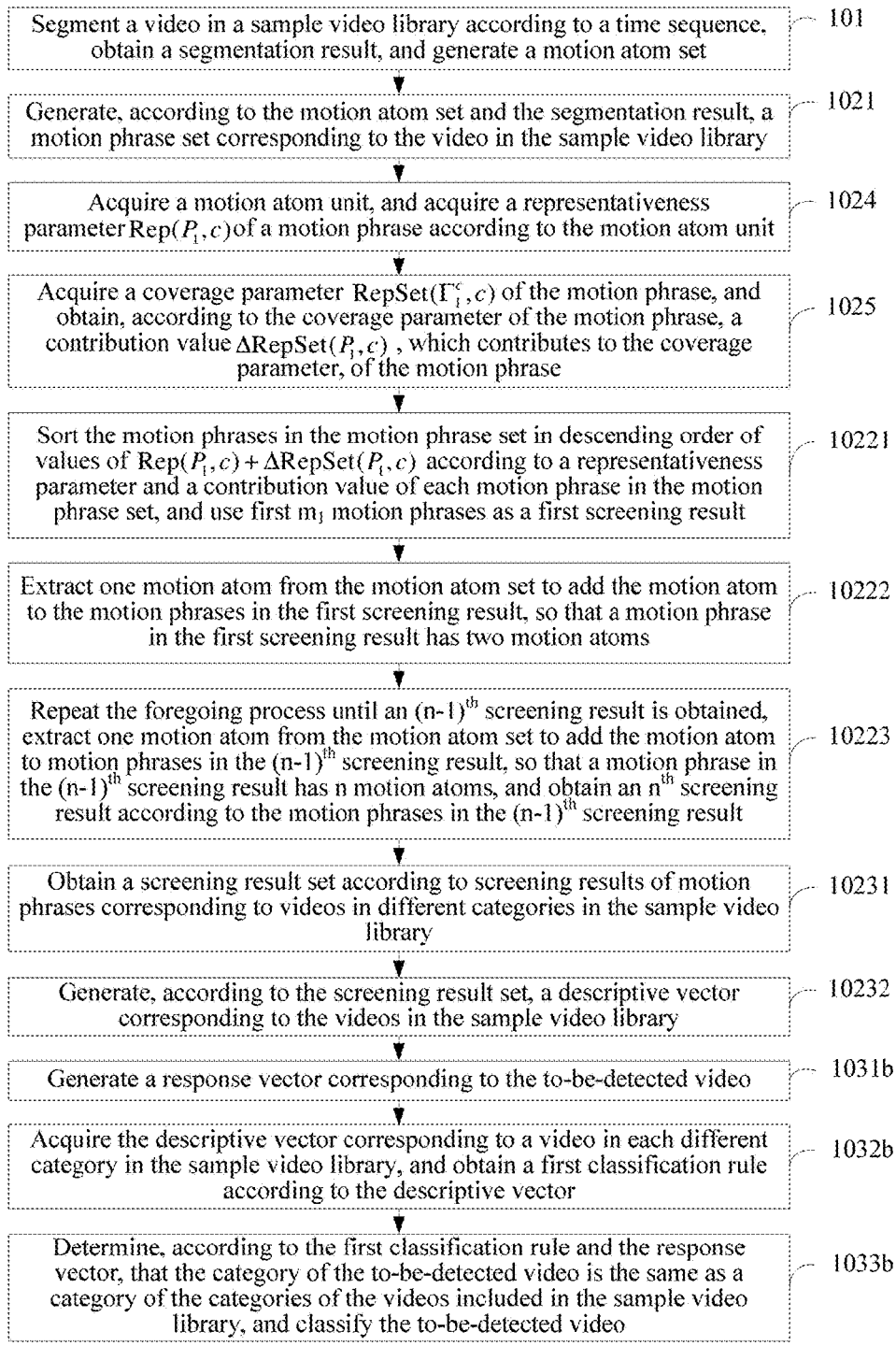
FIG. 3b is a flowchart of still another specific implementation manner of a video classification method according to an embodiment of the present invention.
Figure 3C:
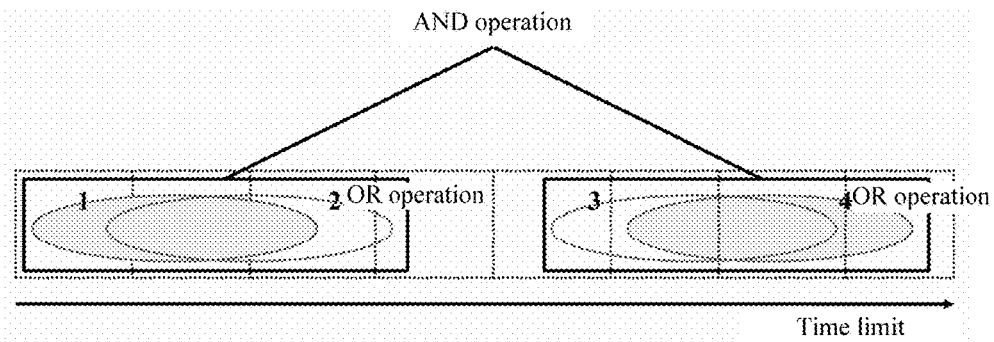
FIG. 3c is a schematic diagram of an exemplary description of an OR operation and an AND operation according to an embodiment of the present invention.

Optionally, based on the solution shown in FIG. 2, an embodiment of the present invention further provides a specific solution of a video classification method. Steps 1024 and 1025 are added in a detailed process of performing step 1022 in FIG. 2, and processes of performing step 1022 and step 103 in FIG. 2 are described in further detail, where step 1022 may be specifically implemented in steps 10221 to 10224, and step 103 may be specifically implemented in steps 1031a to 1034a, as shown in FIG. 3a, which include:

1024. Acquire a motion atom unit $\pi(A,t,\sigma)$, and acquire a representativeness parameter $Rep(P_1,c)$ of a motion phrase according to the motion atom unit.

$$Rep(P_1, c) = \frac{\sum_{i \in S(P_1,c)} r(V, P_1)}{|S(P_1, c)|},$$

where A is a motion atom, t is a time point in a video in the sample video library, σ is a standard deviation of Gaussian distribution, V is a video in the sample video library, $P_1$ is the motion phrase and the motion phrase $P_1$ includes one motion atom in the motion atom set, $r(V,P_1)$ is a response of the motion phrase $P_1$ with respect to the video in the sample video library, $$r(V, P_1) = \min_{OR_i \in P_1} \max_{\pi \in OR_i} v(V, \pi), \text{ and}$$

$$v(V, \pi) = \max_{t' \in \Omega(t)} \text{Score}(\Phi(V, t'), A) \cdot N(t' \mid t, \sigma), \max_{\pi \in OR_i} v(V, \pi)$$

denotes an OR operation in a motion phrase, and the OR operation refers to calculation of responses between a video in a same category in the sample video library and motion atom units that are adjacent in time and that are in a motion phrase, and selection of a response value of a motion atom unit whose time is located in an adjacent area and that has the greatest response;

$$\min_{OR_i \in P_1} \max_{\pi \in OR_i} v(V, \pi)$$

denotes an AND operation in a motion phrase, the AND operation refers to acquiring of a minimum value of responses, selected in the OR operation, of motion atom units having the greatest responses, and when the minimum value is greater than a preset threshold, it indicates that a motion phrase matches a video in the sample video library to a great extent. For example, as shown in FIG. 3c, OR denotes the OR operation, AND denotes the AND operation, a motion atom unit 1 and a motion atom unit 2 are located in adjacent areas in time, a motion atom unit 3 and a motion atom unit 4 are located in adjacent areas in time, the OR operation is performed on the motion atom unit 1 and the motion atom unit 2, a response of the motion atom unit 1 is greater than a response of the motion atom unit 2, a response value of the motion atom unit 1 is selected, at the same time, the OR operation is performed on the motion atom unit 3 and the motion atom unit 4, a response of the motion atom unit 4 is greater than a response of the motion atom unit 3, a response value of the motion atom unit 4 is selected, the response of the motion atom unit 1 and the response of the motion atom unit 4 are compared, and a smaller response value of the response of the motion atom unit 1 and the response of the motion atom unit 4 is selected. $S(P_1,c)$ denotes a set of videos, with respect to which a motion phrase has the greatest response, in the sample video library, c is an identifier of a category of a video in the sample video library, $\Phi(V,t')$ denotes a video feature of a segment result that is in a video in the sample video library and that starts from t', Score $(\Phi(V,t'),A)$ denotes a score obtained by inputting $\Phi(V,t')$ into a support vector machine SVM classifier, $N(t'|t,\sigma)$ denotes Gaussian distribution with a mean t and a standard deviation σ, and $\Omega(t)$ denotes an adjacent area with a center t.

A representativeness parameter requires that a response of a motion phrase with respect to a video in a category is as strong as possible, and indicates that the motion phrase is representative of the video in the category.

Further, a distinguishability parameter $Dis(P_1,c)$ of the motion phrase $P_1$ for a video in a category indicates a difference between representativeness of the motion phrase for a video in a category and that of the motion phrase for a video in another category, and a larger distinguishability parameter indicates higher distinguishability performance of the motion phrase.

$$Dis(P_1, c) = Rep(P_1, c) - \max_{c_i \in C-c} Rep(P_1, c_i),$$

and C denotes categories of all videos in the sample video library.

1025. Acquire a coverage parameter $RepSet(\Gamma_1^c, c)$ of the motion phrase, and obtain, according to the coverage parameter $RepSet(\Gamma_1^c, c)$ of the motion phrase, a contribution value $\Delta RepSet(P_1, c)$, which contributes to the coverage parameter, of the motion phrase.

$$RepSet(\Gamma_1^c, c) = \frac{1}{T_c} \left| \bigcup_{P_1 \in \Gamma} S(P_1, c) \right|,$$

$$\Delta RepSet(P_1 c) = RepSet(\Gamma_1^c, c) - RepSet(\Gamma_1^c - \{P_1\}, c),$$

$T_c$ is a quantity of segments obtained by segmenting a video whose identifier is c and that is in the sample video library, $\Gamma_1^c$ is the motion phrase set, and an identifier of a category of a video to which the motion atom included in the motion phrase belongs is c.

Coverage requires that a motion phrase set generated by motion phrases screened out can cover videos in various categories as much as possible.

Steps 1024 and 1025 are performed for each motion phrase in the motion phrase set, and a representativeness parameter and a contribution value of each motion phrase in the motion phrase set are obtained.

10221. Sort the motion phrases in the motion phrase set in descending order of values of $Rep(P_1,c)+\Delta RepSet(P_1,c)$ according to a representativeness parameter and a contribution value of each motion phrase in the motion phrase set, and use first $m_1$ motion phrases as a first screening result.

$m_1$ is a positive integer greater than or equal to 1, and $m_1$ may be a value set by a system according to categories of videos and a quantity of videos in the sample video library, or may be set and input by a user.

10222. Extract one motion atom from the motion atom set to add the motion atom to the motion phrases in the first screening result, so that a motion phrase in the first screening result has two motion atoms.

The system may extract a motion atom from the motion atom set to add the motion atom to the motion phrases in the first screening result, and generate, by using a method of traversing, a new motion phrase having two motion atoms, where the two motion atoms in the generated new motion phrase do not occur at a same time point.

10223. Repeat the foregoing process until an $(n-1)^{th}$ screening result is obtained, extract one motion atom from the motion atom set to add the motion atom to motion phrases in the $(n-1)^{th}$ screening result, so that a motion phrase in the $(n-1)^{th}$ screening result has n motion atoms, and obtain an $n^{th}$ screening result according to the motion phrases in the $(n-1)^{th}$ screening result.

For example, a motion phrase in the motion phrase set includes one motion atom in the motion atom set, in step 10221, the first screening result is obtained, in step 10222, a new motion phrase having two motion atoms is obtained, the process in step 10221 is used again to screen new motion phrases having two motion atoms each, to obtain the second screening result, the process in step 10222 is used again to obtain new motion phrases having three motion atoms each, and the like, until the $n^{th}$ screening result is obtained.

The $n^{th}$ screening result is first $m_n$ motion phrases arranged in descending order of values of $Rep(P_n,c)+\Delta RepSet(P_n,c)$ where $m_n$ is a positive integer greater than or equal to 1, a motion phrase in the $n^{th}$ screening result has n motion atoms, and n is a positive integer greater than or equal to 1. n may be a value set by a system according to categories of videos and a quantity of videos in the sample video library, or may be set and input by a user.

10224. Generate a descriptive vector according to the first to $n^{th}$ screening results.

A motion phrase in the first screening result includes one motion atom in the motion atom set, a motion phrase in the second screening result includes two motion atoms in the motion atom set, and similarly, a motion phrase in the $n^{th}$ screening result includes n motion atoms in the motion atom set.

A set of motion phrases screened out is generated according to the motion phrases in the first to $n^{th}$ screening results, the set of motion phrases screened out is used as a base to obtain a descriptive vector of a video in the sample video library, each video in the sample video library has a corresponding descriptive vector, and each component in a descriptive vector is a response of a motion phrase in the first to $n^{th}$ screening results with respect to a video in the sample video library.

1031a. Generate a response vector corresponding to the to-be-detected video.

The set of motion phrases screened out in 10224 is used as a base to generate the response vector corresponding to the to-be-detected video, and each component in the response vector is a response of a motion phrase in the first to $n^{th}$ screening results with respect to the to-be-detected video.

1032a. Obtain a second classification rule according to a descriptive vector corresponding to each video in the sample video library.

The sample video library includes at least two videos, and the videos in the sample video library are in a same category. The second classification rule may be generated according to the descriptive vector. For example, an SVM (Support Vector Machine, support vector machine) classifier is used to perform classification, an obtained descriptive vector of a video in the sample video library is input into the SVM classifier, and the SVM classifier generates a classification rule, where the classification rule may be the second classification rule, and the second classification rule is used to detect whether the category of the to-be-detected video is the same as that of the video in the sample video library.

1033a. Detect whether the response vector of the to-be-detected video conforms to the second classification rule.

The second classification rule generated in step 1032a is used to detect the response vector of the to-be-detected video, to determine whether a category of the to-be-detected video is the same as that of a video in the sample library.

1034a. If the response vector corresponding to the to-be-detected video conforms to the second classification rule, determine that a category of the to-be-detected video is the same as that of a video in the sample video library.

The sample video library includes at least two videos, and the videos in the sample video library are in a same category. If the response vector of the to-be-detected video conforms to the second classification rule, it is determined that a category of the to-be-detected video is the same as that of a video in the sample video library; and if the response vector of the to-be-detected video does not conform to the second classification rule, it is determined that a category of the to-be-detected video is different from that of a video in the sample video library, and the to-be-detected video is classified. For example, the sample video library includes five videos, and the five videos are all dance videos. It is detected whether a to-be-detected video is in a dance category, and the to-be-detected video is classified. To-be-detected videos may be classified into two categories: a dance video and a non-dance video.

In the video classification method provided in this embodiment of the present invention, a video in a sample video library can be segmented to generate motion atoms, a motion phrase of the video in the sample video library is generated by using a segmentation result and the motion atoms, a representativeness parameter and a contribution value that contributes to a coverage parameter are calculated for each motion phrase, a motion phrase including one motion atom is first generated, a motion phrase that has desirable representativeness and coverage is screened out according to a representativeness parameter and a contribution value that contributes to a coverage parameter, to obtain a first screening result, one motion atom is added to motion phrases in the first screening result to obtain new motion phrases, the obtained new motion phrases are screened according to a representativeness parameter and a contribution value that contributes to a coverage parameter, to obtain a second screening result, and this process is repeated until an $n^{th}$ screening result is obtained, a descriptive vector is generated according to the first to $n^{th}$ screening results, a second classification rule is generated according to the descriptive vector, a response vector of a to-be-detected video is obtained, and it is detected whether a category of the to-be-detected video is the same as a category of a video in the sample video library, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified.

Further, based on the solutions shown in FIG. 2 and FIG. 3a, an embodiment of the present invention further provides a specific solution of a video classification method, and describes in further detail processes of performing steps 1023 and 103 in FIG. 2. Step 1023 may be specifically implemented in steps 10231 and 10232, and step 103 may be specifically implemented in steps 1031b to 1033b, as shown in FIG. 3b, which include:

10231. Obtain a screening result set according to screening results of motion phrases corresponding to videos in different categories in the sample video library.

The sample video library includes at least two videos, and the sample video library includes videos in at least two categories. A video in each category in the sample video library has corresponding first to $n^{th}$ screening results, the first to $n^{th}$ screening results corresponding to the videos in the different categories in the sample video library are combined to obtain the screening result set, and the screening result set includes motion phrases corresponding to the videos in all the different categories in the sample video library.

10232. Generate, according to the screening result set, a descriptive vector corresponding to the videos in the sample video library.

Motion phrases in the screening result set are used as a base to generate a descriptive vector corresponding to a video in the sample video library, each video in the sample video library has a corresponding descriptive vector, and each component in a descriptive vector is a response, with respect to a video in the sample video library, of a motion phrase in the first to $n^{th}$ screening results corresponding to a video in a different category in the sample video library.

1031b. Generate a response vector corresponding to the to-be-detected video.

A motion phrase in the screening result set obtained in step 10231 is used as a base to generate the response vector corresponding to the to-be-detected video, and a component in the response vector is a response, with respect to the to-be-detected video, of a motion phrase in the first to $n^{th}$ screening results corresponding to a video in a different category in the sample video library.

1032b. Acquire the descriptive vector corresponding to a video in each different category in the sample video library, and obtain a first classification rule according to the descriptive vector.

The sample video library includes at least two videos, and the sample video library includes videos in at least two categories. The first classification rule is generated according to the descriptive vector corresponding to a video in each different category in the sample video library. For example, an SVM (Support Vector Machine, support vector machine) classifier is used to perform classification, an obtained descriptive vector of a video in a different category in the sample video library is input into the SVM classifier, and the SVM classifier generates a classification rule, where the classification rule may be the first classification rule, and the first classification rule is used to determine a category to which the to-be-detected video belongs.

1033b. Determine, according to the first classification rule and the response vector, that the category of the to-be-detected video is the same as a category of the categories of the videos included in the sample video library, and classify the to-be-detected video.

The sample video library includes videos in at least two categories, and the first classification rule is used to determine a category to which the to-be-detected video belongs. For example, the sample video library includes videos in three categories, which are separately dance videos, sports videos, and acrobatics videos, an SVM (Support Vector Machine, support vector machine) classifier is used to classify to-be-detected videos, the first classification rule is generated in step 1032b, the response vector, obtained in step 1031*b*, of the to-be-detected video is input to the SVM classifier, and the SVM classifier classifies the to-be-detected video as one of three categories of dance videos, sports videos, and acrobatics videos.

In the video classification method provided in this embodiment of the present invention, a video in a sample video library can be segmented to generate motion atoms, a motion phrase of the video in the sample video library is generated by using a segmentation result and the motion atoms, a representativeness parameter and a contribution value that contributes to a coverage parameter are calculated for each motion phrase, a motion phrase including one motion atom is first generated, a motion phrase that has desirable representativeness and coverage is screened out according to a representativeness parameter and a contribution value that contributes to a coverage parameter, to obtain a first screening result, one motion atom is added to motion phrases in the first screening result to obtain new motion phrases, the obtained new motion phrases are screened according to a representativeness parameter and a contribution value that contributes to a coverage parameter, to obtain a second screening result, and this process is repeated until an $n^{th}$ screening result is obtained, the first to $n^{th}$ screening results corresponding to a video in a different category in the sample library are combined to obtain a screening result set, a descriptive vector is generated according to the screening result set, a first classification rule is generated by using the descriptive vector, a response vector of a to-be-detected video is obtained, and it is determined that a category of the to-be-detected video is the same as a category of categories of videos included in the sample video library, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and videos, which include long-time continuous and complex motions, in multiple categories can be accurately classified.

Figure 4A:
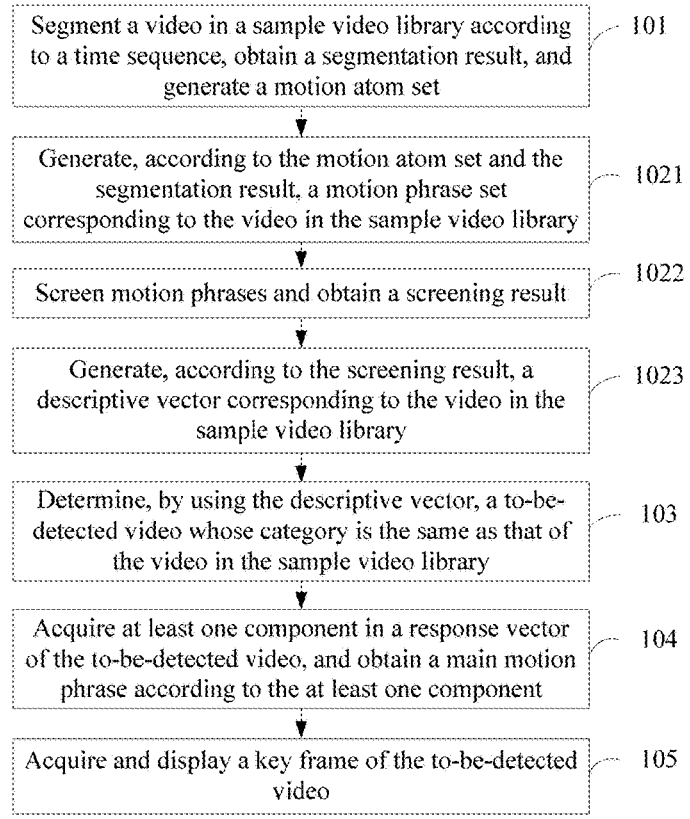
FIG. 4a is a flowchart of yet another specific implementation manner of a video classification method according to an embodiment of the present invention.

Optionally, based on the solution shown in FIG. 2, an embodiment of the present invention further provides a specific solution of a video classification method. Steps 104 and 105 are added, where main information of a to-be-detected video can be extracted and displayed, and as shown in FIG. 4*a*, steps 104 and 105 include:

104. Acquire at least one component in a response vector of the to-be-detected video, and obtain a main motion phrase according to the at least one component.

A component in a response vector of a to-be-detected video may indicate a response, with respect to the to-be-detected video, of a motion phrase screened out, and a greater component indicates that the to-be-detected video matches, to a greater extent, a motion phrase corresponding to the component.

The main motion phrase is a motion phrase corresponding to at least one component. For example, a response vector of a to-be-detected video has ten components, the ten components are arranged in descending order, and first three components are acquired and a motion phrase corresponding to the first three motion phrases is obtained, where the motion phrase corresponding to the first three motion phrases is the main motion phrase.

105. Acquire and display a key frame of the to-be-detected video.

Figure 4B:
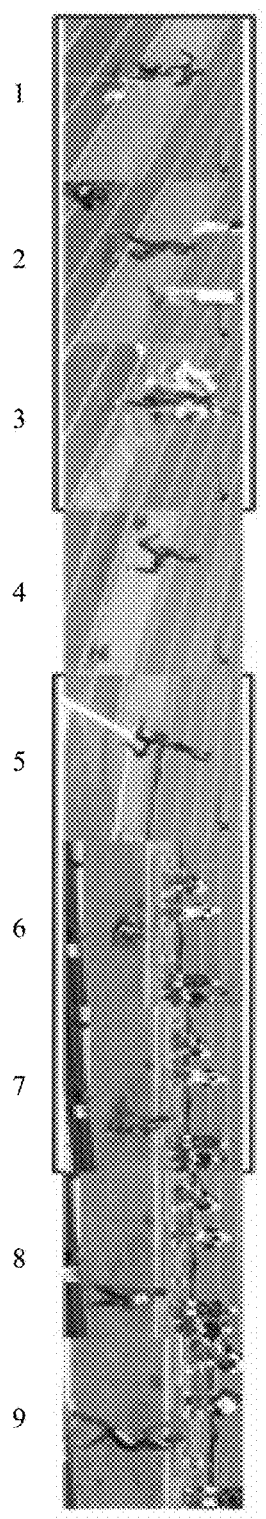
FIG. 4b is a schematic diagram of an exemplary description of displaying main information in a video according to an embodiment of the present invention.

The key frame has the greatest response to each motion atom unit in the main motion phrase. Therefore, the key frame can indicate principal information in the to-be-detected video. In addition to the key frame of the to-be-detected video, a system may further display a frame near the key frame, to present main content, including a motion, in the to-be-detected video. For example, as shown in FIG. 4*b*, by using the process in steps 104 and 105, it can be known that key frames are the second frame and the sixth frame in nine continuous frames of a long jump motion in a video, the key frames and frames near the key frames are displayed; therefore, the first to third frames and the fifth to seventh frames are displayed.

In the video classification method provided in this embodiment of the present invention, a video in a sample video library can be segmented to generate motion atoms, motion phrases of the video in the sample video library are generated by using a segmentation result and the motion atoms, the motion phrases are screened and a descriptive vector is generated according to a screening result, and a to-be-detected video whose category is the same as that of the video in the sample video library is determined by using the descriptive vector, thereby achieving an objective of video classification. A main motion phrase may be further obtained according to a component in a response vector of a to-be-detected video, to obtain and display a key frame. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified. Meanwhile, a key frame of a to-be-detected video may be further obtained and displayed by using a component in a response vector of the to-be-detected video, and main content of the to-be-detected video is presented clearly and concisely, so that a user can quickly know the main content of the video.

Figure 5:
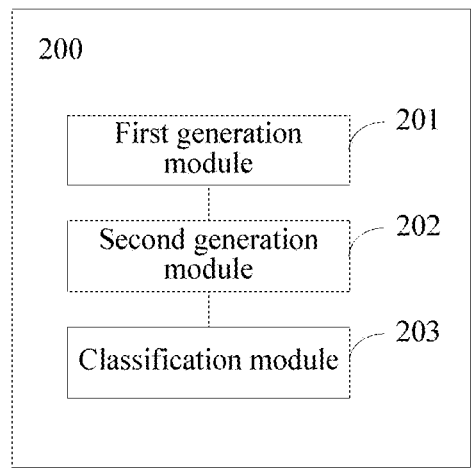
FIG. 5 is a schematic structural diagram of a video classification apparatus according to an embodiment of the present invention.

An embodiment of the present invention further provides a video classification apparatus 200. As shown in FIG. 5, the apparatus includes a first generation module 201 configured to segment a video in a sample video library according to a time sequence, to obtain a segmentation result, and to generate a motion atom set. The sample video library includes at least one video, and a motion atom in the motion atom set is generated according to the video in the sample video library. A second generation module 202 is configured to generate, by using the motion atom set and the segmentation result, a descriptive vector corresponding to the video in the sample video library. A classification module 203 is configured to determine, by using the descriptive vector, a to-be-detected video whose category is the same as that of the video in the sample video library.

In the video classification apparatus provided in this embodiment of the present invention, a video in a sample video library can be segmented to generate motion atoms, a descriptive vector of the video in the sample video library is generated by using a segmentation result and the motion atoms, and a to-be-detected video whose category is the same as that of the video in the sample video library is determined by using the descriptive vector, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and a descriptive vector is generated according to the motion phrase. In this way, a video including a long-time continuous and complex motion can be accurately classified.

Figure 6:
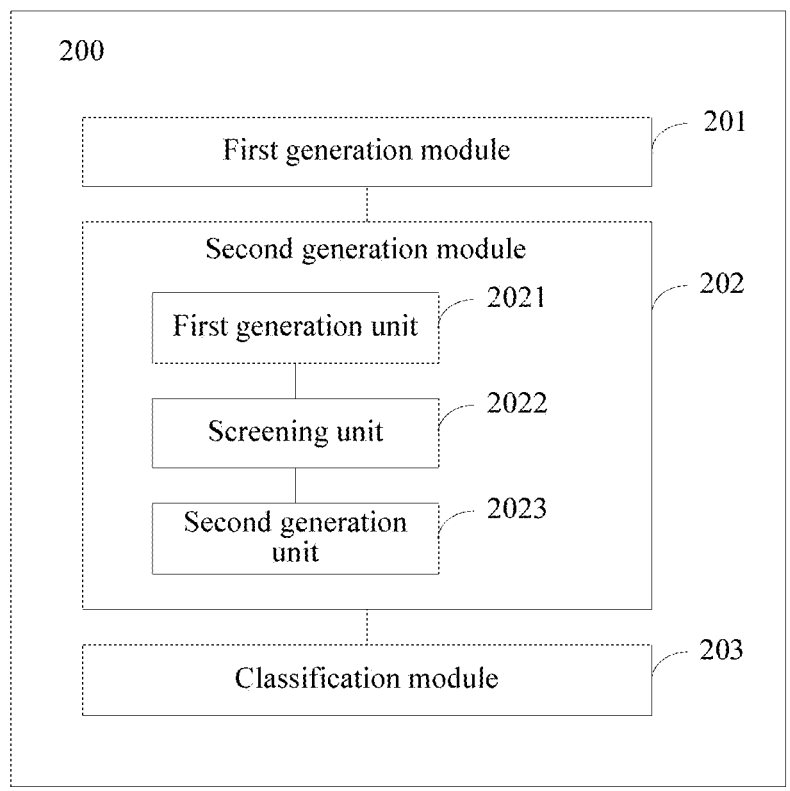
FIG. 6 is a schematic structural diagram of a specific implementation manner of a video classification apparatus according to an embodiment of the present invention.

Optionally, as shown in FIG. 6, the second generation module 202 includes:

a first generation unit 2021, configured to generate, according to the motion atom set and the segmentation result, a motion phrase set corresponding to the video in the sample video library;

The motion phrase set includes at least two motion phrases, and a motion phrase includes motion atoms that occur in a sequence near time points.

Optionally, the sample video library includes at least two videos, and the videos in the sample video library are in a same category. A screening unit 2022 is configured to screen the motion phrases and obtain a screening result. A second generation unit 2023 is configured to generate, according to the screening result, the descriptive vector corresponding to the video in the sample video library.

In the video classification apparatus provided in this embodiment of the present invention, a video in a sample video library can be segmented to generate motion atoms, motion phrases of the video in the sample video library are generated by using a segmentation result and the motion atoms, the motion phrases are screened and a descriptive vector is generated according to a screening result, and a to-be-detected video whose category is the same as that of the video in the sample video library is determined by using the descriptive vector, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified.

Figure 7:
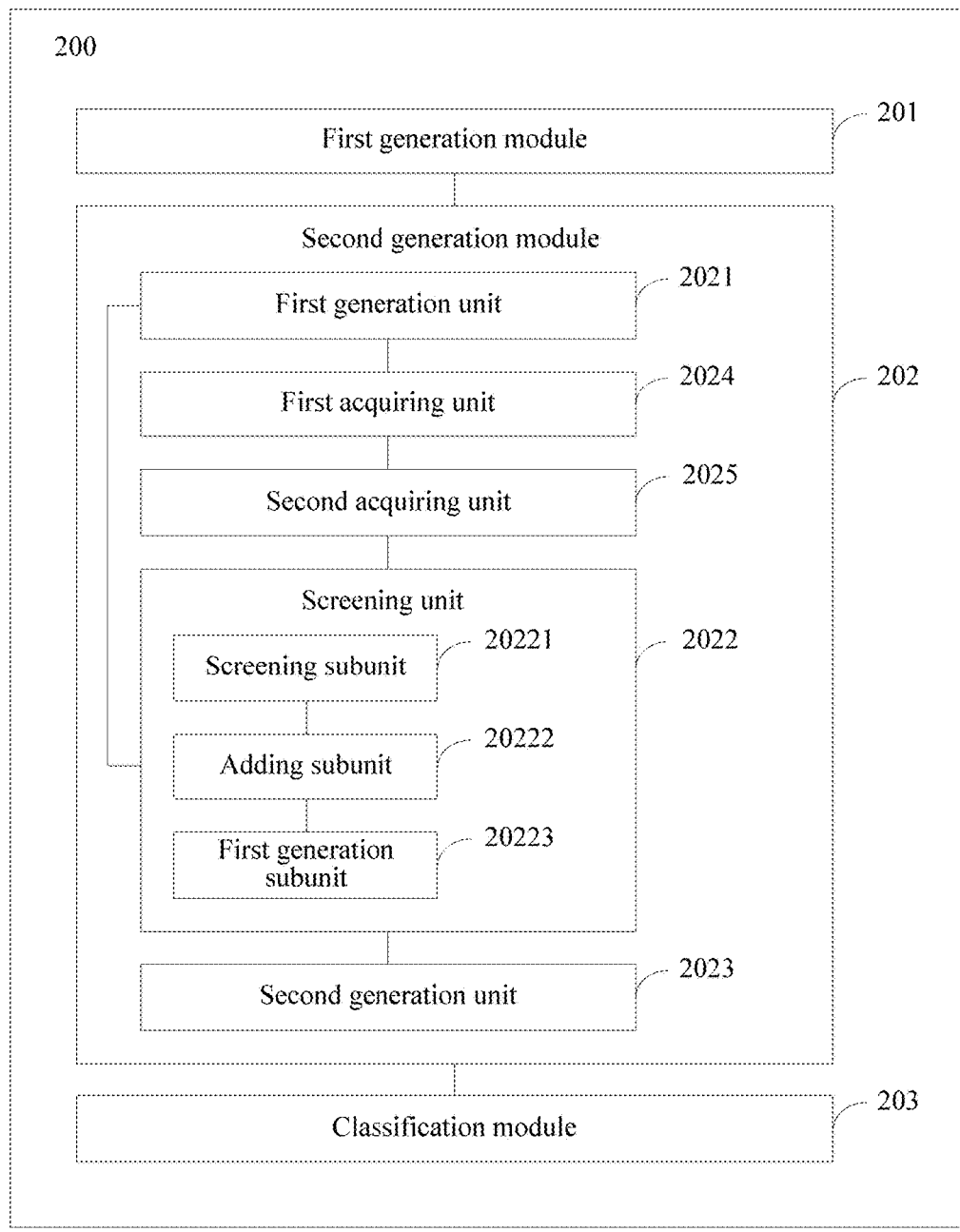
FIG. 7 is a schematic structural diagram of another video classification apparatus according to an embodiment of the present invention.

Optionally, as shown in FIG. 7, the second generation module 202 further includes: a first acquiring unit 2024 configured to acquire a motion atom unit $\pi(A,t,\sigma)$ and acquire a representativeness parameter $Rep(P_1,c)$ of a motion phrase according to the motion atom unit.

$$Rep(P_1, c) = \frac{\sum_{i \in S(P_1,c)} r(V, P_1)}{|S(P_1, c)|},$$

wherein A is a motion atom, t is a time point in a video in the sample video library, $\sigma$ is a standard deviation of Gaussian distribution, V is a video in the sample video library, $P_1$ is the motion phrase, $r(V,P_1)$ is a response of the motion phrase $P_1$ with respect to the video in the sample video library, $$r(V, P_1) = \min_{OR_i \in P_1} \max_{\pi \in OR_i} v(V, \pi),$$

$$v(V, \pi) = \max_{t' \in \Omega(t)} Score(\Phi(V, t'), A) \cdot N(t' | t, \sigma),$$

and wherein $OR_i$ refers to calculation of responses between the video in the sample video library and the motion atom units that are adjacent in time, $S(P_1,c)$ denotes a set of videos, with respect to which a motion phrase has the greatest response, in the sample video library, c is an identifier of a category of a video in the sample video library, $\Phi(V,t')$ denotes a video feature of a segment result that is in a video in the sample video library and that starts from t', $Score(\Phi(V,t'),A)$ denotes a score obtained by inputting $\Phi(V, t')$ into a support vector machine SVM classifier, $N(t'|t,\sigma)$ denotes Gaussian distribution with a mean t and a standard deviation σ, and Ω(t) denotes an adjacent area with a center t. A motion phrase in the motion phrase set includes one motion atom in the motion atom set. A second acquiring unit 2025 is configured to acquire a coverage parameter RepSet ($\Gamma_1^c$,c) of the motion phrase, and obtain, according to the coverage parameter RepSet($\Gamma_1^c$,c) of the motion phrase, a contribution value ΔRepSet($P_1$,c), which contributes to the coverage parameter, of the motion phrase.

$$RepSet(\Gamma_1^c, c) = \frac{1}{T_c}\left|\bigcup_{P_1 \in \Gamma} S(P_1, c)\right|,$$

wherein ΔRepSet($P_1$,c)=RepSet($\Gamma_1^c$,c)−RepSet($\Gamma_1^c$−{$P_1$}, c), $T_c$ is a quantity of segments obtained by segmenting a video whose identifier is c and that is in the sample video library, $\Gamma_1^c$ is the motion phrase set, and an identifier of a category of a video to which the motion atom included in the motion phrase belongs is c.

The foregoing units are executed for each motion phrase in the motion phrase set, and a representativeness parameter and a contribution value of each motion phrase in the motion phrase set are obtained. The screening unit 2022 includes a screening subunit 20221, which is configured to sort the motion phrases in the motion phrase set in descending order of values of Rep($P_1$,c)+ΔRepSet($P_1$,c) according to a representativeness parameter and a contribution value of each motion phrase in the motion phrase set, and use first $m_1$ motion phrases as a first screening result, where $m_1$ is a positive integer greater than or equal to 1. An adding subunit 20222 is configured to extract one motion atom from the motion atom set to add the motion atom to the motion phrases in the first screening result, so that a motion phrase in the first screening result has two motion atoms. The screening subunit and the adding subunit are continuously executed until an $(n-1)^{th}$ screening result is obtained, one motion atom is extracted from the motion atom set to add the motion atom to motion phrases in the $(n-1)^{th}$ screening result, so that a motion phrase in the $(n-1)^{th}$ screening result has n motion atoms, and an $n^{th}$ screening result is obtained according to the motion phrases in the $(n-1)^{th}$ screening result, where the $n^{th}$ screening result is first $m_n$ motion phrases arranged in descending order of values of Rep($P_n$,c)+ΔRepSet($P_n$,c), where $m_n$ is a positive integer greater than or equal to 1, a motion phrase in the $n^{th}$ screening result has n motion atoms, and n is a positive integer greater than or equal to 1. A first generation subunit 20223, is configured to generate the descriptive vector according to the first to $n^{th}$ screening results.

In the video classification apparatus provided in this embodiment of the present invention, a video in a sample video library can be segmented to generate motion atoms, a motion phrase of the video in the sample video library is generated by using a segmentation result and the motion atoms, a representativeness parameter and a contribution value that contributes to a coverage parameter are calculated for each motion phrase, a motion phrase including one motion atom is first generated, a motion phrase that has desirable representativeness and coverage is screened out according to a representativeness parameter and a contribution value that contributes to a coverage parameter, to obtain a first screening result, one motion atom is added to motion phrases in the first screening result to obtain new motion phrases, the obtained new motion phrases are screened according to a representativeness parameter and a contribution value that contributes to a coverage parameter, to obtain a second screening result, and this process is repeated until an $n^{th}$ screening result is obtained, a descriptive vector is generated according to the first to $n^{th}$ screening results, a second classification rule is generated according to the descriptive vector, a response vector of a to-be-detected video is obtained, and it is detected whether a category of the to-be-detected video is the same as a category of a video in the sample video library, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified.

Figure 8:
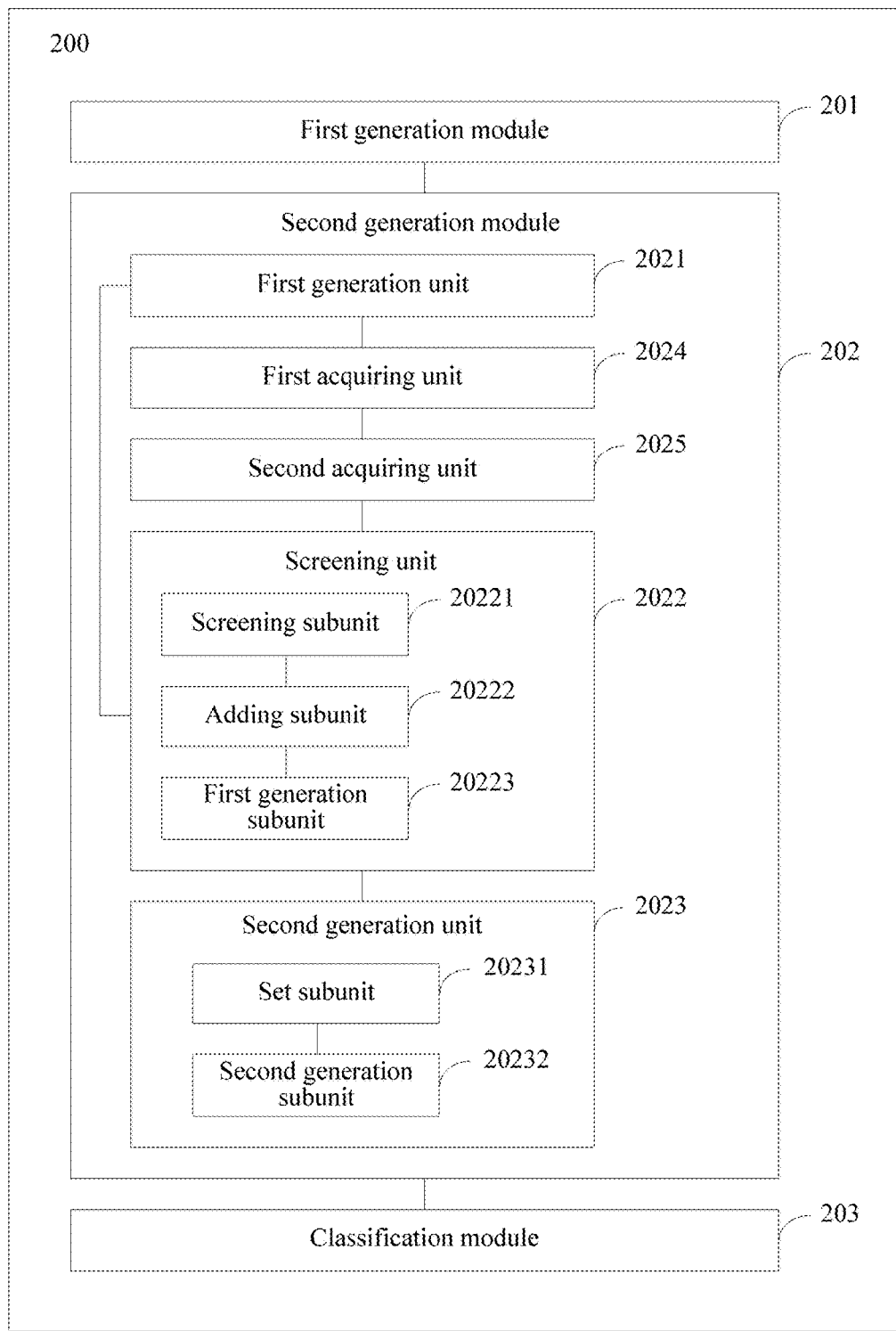
FIG. 8 is a schematic structural diagram of a specific implementation manner of another video classification apparatus according to an embodiment of the present invention.

Optionally, as shown in FIG. 8, the second generation unit 2023 includes a set subunit 20231, configured to obtain a screening result set according to screening results of the motion phrases corresponding to the videos in the different categories in the sample video library. The sample video library includes at least two videos, and the sample video library includes videos in at least two categories. A second generation subunit 20232 is configured to generate, according to the screening result set, the descriptive vector corresponding to the videos in the sample video library.

In the video classification apparatus provided in this embodiment of the present invention, a video in a sample video library can be segmented to generate motion atoms, a motion phrase of the video in the sample video library is generated by using a segmentation result and the motion atoms, a representativeness parameter and a contribution value that contributes to a coverage parameter are calculated for each motion phrase, a motion phrase including one motion atom is first generated, a motion phrase that has desirable representativeness and coverage is screened out according to a representativeness parameter and a contribution value that contributes to a coverage parameter, to obtain a first screening result, one motion atom is added to motion phrases in the first screening result to obtain new motion phrases, the obtained new motion phrases are screened according to a representativeness parameter and a contribution value that contributes to a coverage parameter, to obtain a second screening result, and this process is repeated until an $n^{th}$ screening result is obtained, the first to $n^{th}$ screening results corresponding to a video in a different category in the sample library are combined to obtain a screening result set, a descriptive vector is generated according to the screening result set, a first classification rule is generated by using the descriptive vector, a response vector of a to-be-detected video is obtained, and it is determined that a category of the to-be-detected video is the same as a category of categories of videos included in the sample video library, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and videos, which include long-time continuous and complex motions, in multiple categories can be accurately classified.

Figure 9:
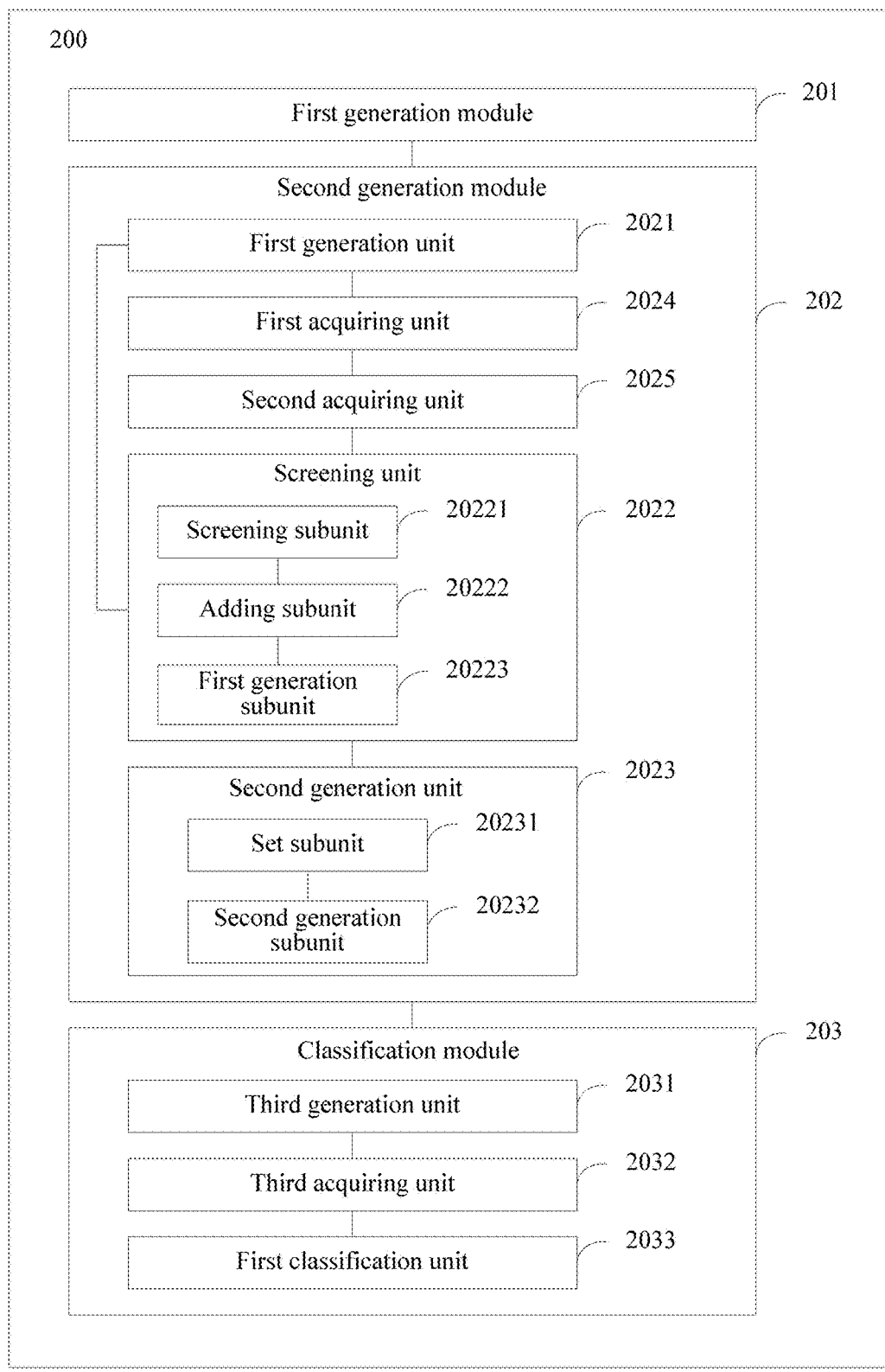
FIG. 9 is a schematic structural diagram of another specific implementation manner of another video classification apparatus according to an embodiment of the present invention.

Optionally, as shown in FIG. 9, the classification module 203 includes a third generation unit 2031, configured to generate a response vector corresponding to the to-be-detected video, and a third acquiring unit 2032, configured to acquire the descriptive vector corresponding to a video in each different category in the sample video library, and obtain a first classification rule according to the descriptive vector. The first classification rule is used to determine the category to which the to-be-detected video belongs. A first classification unit 2033 is configured to determine, according to the first classification rule and the response vector, that the category of the to-be-detected video is the same as a category of the categories of the videos included in the sample video library, and classify the to-be-detected video.

In the video classification apparatus provided in this embodiment of the present invention, a video in a sample video library can be segmented to generate motion atoms, a motion phrase of the video in the sample video library is generated by using a segmentation result and the motion atoms, a representativeness parameter and a contribution value that contributes to a coverage parameter are calculated for each motion phrase, a motion phrase including one motion atom is first generated, a motion phrase that has desirable representativeness and coverage is screened out according to a representativeness parameter and a contribution value that contributes to a coverage parameter, to obtain a first screening result, one motion atom is added to motion phrases in the first screening result to obtain new motion phrases, the obtained new motion phrases are screened according to a representativeness parameter and a contribution value that contributes to a coverage parameter, to obtain a second screening result, and this process is repeated until an $n^{th}$ screening result is obtained, the first to $n^{th}$ screening results corresponding to a video in a different category in the sample library are combined to obtain a screening result set, a descriptive vector is generated according to the screening result set, a first classification rule is generated by using the descriptive vector, a response vector of a to-be-detected video is obtained, and it is determined that a category of the to-be-detected video is the same as a category of categories of videos included in the sample video library, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and videos, which include long-time continuous and complex motions, in multiple categories can be accurately classified.

Figure 10:
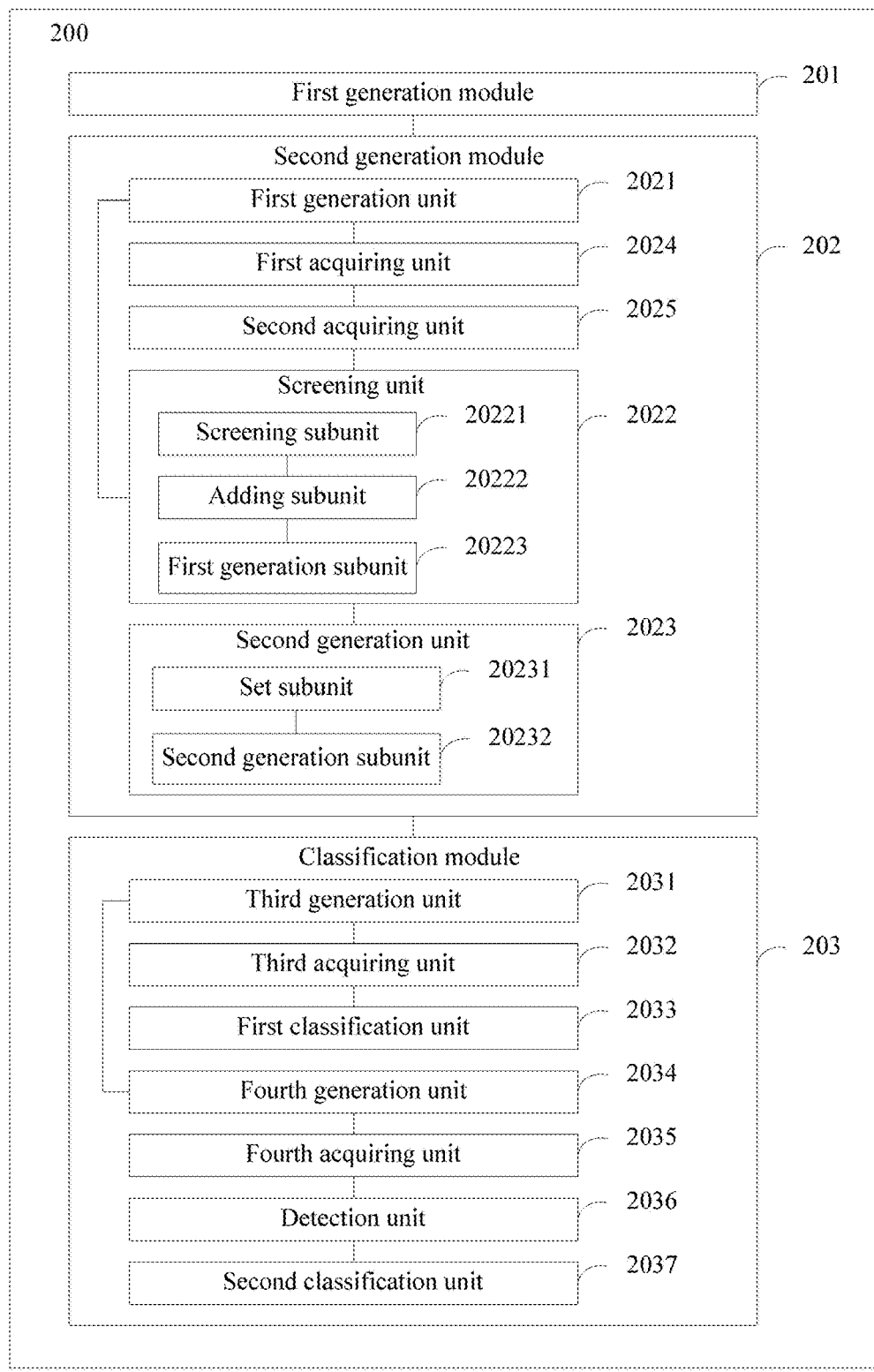
FIG. 10 is a schematic structural diagram of still another specific implementation manner of another video classification apparatus according to an embodiment of the present invention.

Optionally, as shown in FIG. 10, the classification module 203 includes a fourth generation unit 2034, configured to generate a response vector corresponding to the to-be-detected video, and a fourth acquiring unit 2035, configured to obtain a second classification rule according to a descriptive vector corresponding to each video in the sample video library. The second classification rule is used to detect whether the category of the to-be-detected video is the same as that of the video in the sample video library. A detection unit 2036 is configured to detect whether the response vector of the to-be-detected video conforms to the second classification rule, and a second classification unit 2037 is configured to, when the response vector of the to-be-detected video conforms to the second classification rule, determine that the category of the to-be-detected video is the same as that of the video in the sample video library.

In the video classification apparatus provided in this embodiment of the present invention, a video in a sample video library can be segmented to generate motion atoms, a motion phrase of the video in the sample video library is generated by using a segmentation result and the motion atoms, a representativeness parameter and a contribution value that contributes to a coverage parameter are calculated for each motion phrase, a motion phrase including one motion atom is first generated, a motion phrase that has desirable representativeness and coverage is screened out according to a representativeness parameter and a contribution value that contributes to a coverage parameter, to obtain a first screening result, one motion atom is added to motion phrases in the first screening result to obtain new motion phrases, the obtained new motion phrases are screened according to a representativeness parameter and a contribution value that contributes to a coverage parameter, to obtain a second screening result, and this process is repeated until an $n^{th}$ screening result is obtained, a descriptive vector is generated according to the first to $n^{th}$ screening results, a second classification rule is generated according to the descriptive vector, a response vector of a to-be-detected video is obtained, and it is detected whether a category of the to-be-detected video is the same as a category of a video in the sample video library, thereby achieving an objective of video classification. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified.

Figure 11:
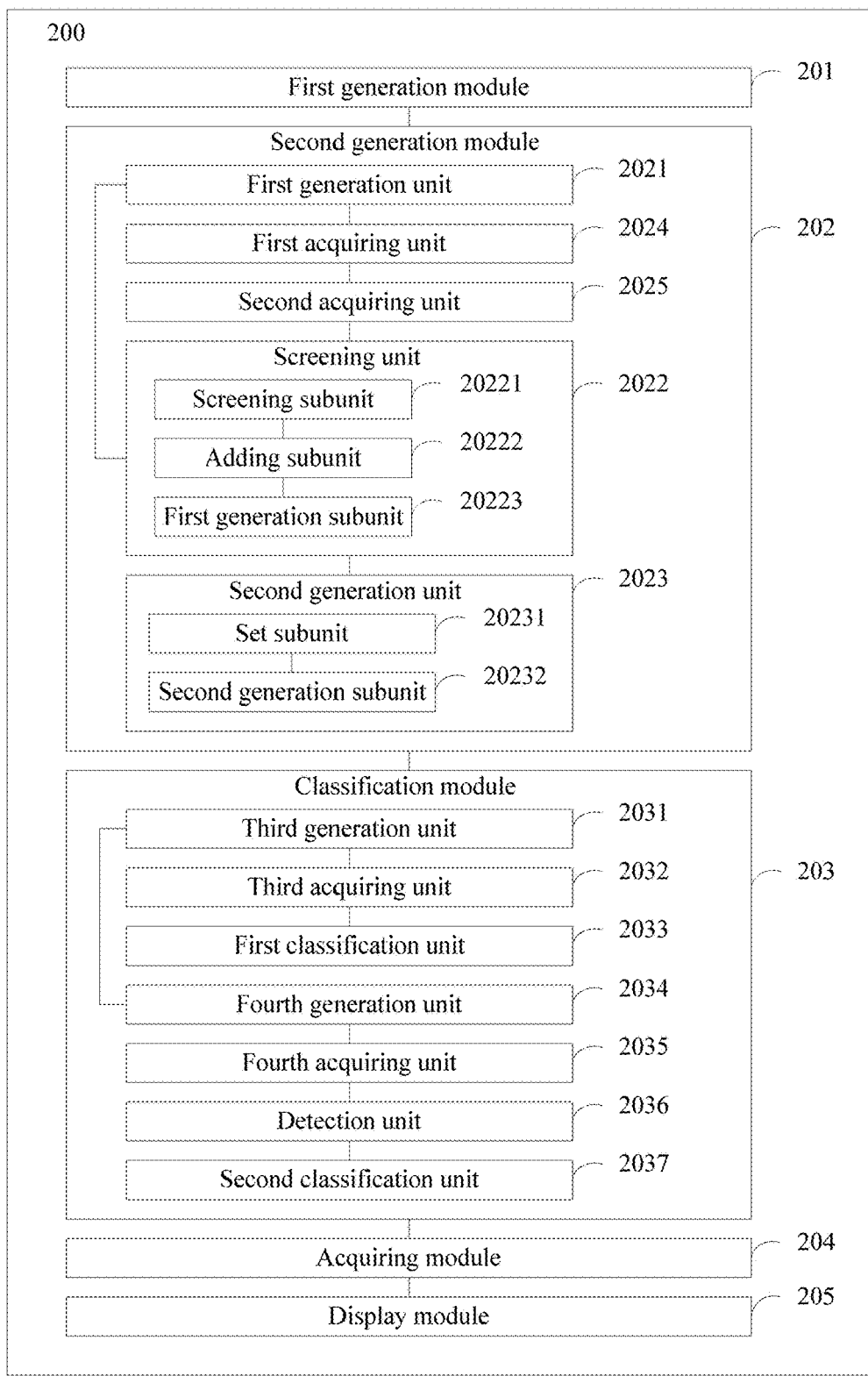
FIG. 11 is a schematic structural diagram of still another video classification apparatus according to an embodiment of the present invention.

Optionally, as shown in FIG. 11, the apparatus 200 further includes an acquiring module 204, configured to acquire at least one component in a response vector of the to-be-detected video, and obtain a main motion phrase according to the at least one component, where the main motion phrase is a motion phrase corresponding to at least one component. A display module 205 is configured to acquire and display a key frame of the to-be-detected video.

The key frame has the greatest response to each motion atom unit in the main motion phrase.

In the video classification apparatus provided in this embodiment of the present invention, a video in a sample video library can be segmented to generate motion atoms, motion phrases of the video in the sample video library are generated by using a segmentation result and the motion atoms, the motion phrases are screened and a descriptive vector is generated according to a screening result, and a to-be-detected video whose category is the same as that of the video in the sample video library is determined by using the descriptive vector, thereby achieving an objective of video classification. A main motion phrase may be further obtained according to a component in a response vector of a to-be-detected video, to obtain and display a key frame. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified. Meanwhile, a key frame of a to-be-detected video may be further obtained and displayed by using a component in a response vector of the to-be-detected video, and main content of the to-be-detected video is presented clearly and concisely, so that a user can quickly know the main content of the video.

Figure 12:
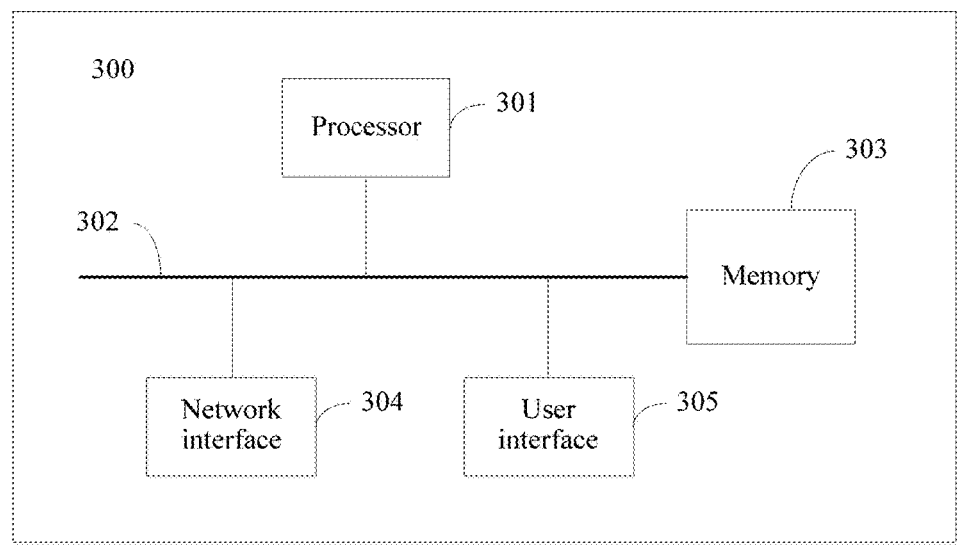
FIG. 12 is a schematic structural diagram of a video classification system according to an embodiment of the present invention.

An embodiment of the present invention further provides a video classification system 300. As shown in FIG. 12, the system includes: at least one processor 301 such as a CPU, at least one communications bus 302, a memory 303, at least one network interface 304 or user interface 305. The communications bus 302 is configured to implement connection and communication between these components. Optionally, the user interface 305 includes devices such as a display, a keyboard, a mouse, and a touch screen. The memory 303 may include a high-speed RAM memory, and may also include a non-volatile memory (non-volatile memory), for example, at least one magnetic disk storage.

Specifically, the memory 303 may be configured to store a sample video library and a segmentation result of a video in the sample video library, may be further configured to store a motion atom set, a descriptive vector and a motion phrase set of a video in the sample video library, may be further configured to store a screening result of motion phrases, a category of a video in the sample video library and a response vector of a to-be-detected video, may be further configured to store a representativeness parameter and a coverage parameter of a motion phrase, a contribution value that contributes to the coverage parameter, and the like, and may be further configured to store a first classification rule and a second classification rule that are generated.

Specifically, the processor 301 may be configured to segment a video in a sample video library according to a time sequence, to obtain a segmentation result, and generate a motion atom set; configured to generate, by using the motion atom set and the segmentation result, a descriptive vector corresponding to the video in the sample video library, and configured to determine, by using the descriptive vector, a to-be-detected video whose category is the same as that of the video in the sample video library.

The sample video library includes at least one video, and a motion atom in the motion atom set is generated according to the video in the sample video library.

Specifically, the processor 301 may be further configured to generate, according to the motion atom set and the segmentation result, a motion phrase set corresponding to the video in the sample video library; configured to screen motion phrases and obtain a screening result; and configured to generate, according to the screening result, the descriptive vector corresponding to the video in the sample video library.

The motion phrase set includes at least two motion phrases, and a motion phrase includes motion atoms that occur in a sequence near time points.

Specifically, the processor 301 may be further configured to acquire a motion atom unit $\pi(A,t,\sigma)$, and acquire a representativeness parameter $Rep(P_1,c)$ of a motion phrase according to the motion atom unit; configured to acquire a coverage parameter $\text{RepSet}(\Gamma_1^c, c)$ of the motion phrase, and obtain, according to the coverage parameter $\text{RepSet}(\Gamma_1^c, c)$ of the motion phrase, a contribution value $\Delta\text{RepSet}(P_1, c)$, which contributes to the coverage parameter, of the motion phrase, where $$\text{RepSet}(\Gamma_1^c, c) = \frac{1}{T_c} \left| \bigcup_{P_1 \in \Gamma} S(P_1, c) \right|;$$

and configured to perform the foregoing process for each motion phrase in the motion phrase set, and obtain a representativeness parameter and a contribution value of each motion phrase in the motion phrase set.

$$\text{Rep}(P_1, c) = \frac{\sum_{i \in S(P_1, c)} r(V, P_1)}{|S(P_1, c)|},$$

wherein A is a motion atom, t is a time point in a video in the sample video library, $\sigma$ is a standard deviation of Gaussian distribution, V is a video in the sample video library, $P_1$ is the motion phrase, $r(V, P_1)$ is a response of the motion phrase $P_1$ with respect to the video in the sample video library, $$r(V, P_1) = \min_{OR_i \in P_1} \max_{\pi \in OR_i} v(V, \pi),$$

$$v(V, \pi) = \max_{t' \in \Omega(t)} \text{Score}(\Phi(V, t'), A) \cdot N(t' | t, \sigma),$$

and wherein $OR_i$ refers to calculation of responses between the video in the sample video library and the motion atom units that are adjacent in time, $S(P_1, c)$ denotes a set of videos, with respect to which a motion phrase has the greatest response, in the sample video library, c is an identifier of a category of a video in the sample video library, $\Omega(V, t')$ denotes a video feature of a segment result that is in a video in the sample video library and that starts from t', $\text{Score}(\Phi(V, t'), A)$ denotes a score obtained by inputting $\Phi(V, t')$ into a support vector machine SVM classifier, $N(t'|t, \sigma)$ denotes Gaussian distribution with a mean t and a standard deviation $\sigma$, and $\Omega(t)$ denotes an adjacent area with a center t.

$\Delta\text{RepSet}(P_1, c) = \text{RepSet}(\Gamma_1^c, c) - \text{RepSet}(\Gamma_1^c - \{P_1\}, c)$, $T_c$ is a quantity of segments obtained by segmenting a video whose identifier is c and that is in the sample video library, $\Gamma_1^c$ is the motion phrase set, and an identifier of a category of a video to which the motion atom included in the motion phrase belongs is c.

The sample video library includes at least two videos, and the videos in the sample video library are in a same category. A motion phrase in the motion phrase set includes one motion atom in the motion atom set.

Specifically, the processor 301 may be further configured to sort the motion phrases in the motion phrase set in descending order of values of $\text{Rep}(P_1, c) + \Delta\text{RepSet}(P_1, c)$ according to a representativeness parameter and a contribution value of each motion phrase in the motion phrase set, and use first $m_1$ motion phrases as a first screening result; configured to extract one motion atom from the motion atom set to add the motion atom to the motion phrases in the first screening result, so that a motion phrase in the first screening result has two motion atoms; configured to repeat the foregoing process until an $(n-1)^{th}$ screening result is obtained, extract one motion atom from the motion atom set to add the motion atom to motion phrases in the $(n-1)^{th}$ screening result, so that a motion phrase in the $(n-1)^{th}$ screening result has n motion atoms, and obtain an $n^{th}$ screening result according to the motion phrases in the $(n-1)^{th}$ screening result, where the $n^{th}$ screening result is first $m_n$ motion phrases arranged in descending order of values of $\text{Rep}(P_n, c) + \Delta\text{RepSet}(P_n, c)$, $m_n$ is a positive integer greater than or equal to 1, and a motion phrase in the $n^{th}$ screening result has n motion atoms; and configured to generate the descriptive vector according to the first to $n^{th}$ screening results.

$m_1$ is a positive integer greater than or equal to 1, and n is a positive integer greater than or equal to 1.

Specifically, the processor 301 may be further configured to obtain a screening result set according to screening results of the motion phrases corresponding to the videos in the different categories in the sample video library; and configured to generate, according to the screening result set, the descriptive vector corresponding to the videos in the sample video library.

The sample video library includes at least two videos, and the sample video library includes videos in at least two categories.

Specifically, the processor 301 may be further configured to generate a response vector corresponding to the to-be-detected video; configured to acquire the descriptive vector corresponding to a video in each different category in the sample video library, and obtain a first classification rule according to the descriptive vector; and configured to determine, according to the first classification rule and the response vector, that the category of the to-be-detected video is the same as a category of the categories of the videos included in the sample video library, and classify the to-be-detected video.

The first classification rule is used to determine the category to which the to-be-detected video belongs.

Specifically, the processor 301 may be further configured to generate a response vector corresponding to the to-be-detected video; configured to obtain a second classification rule according to a descriptive vector corresponding to each video in the sample video library; configured to detect whether the response vector of the to-be-detected video conforms to the second classification rule; and configured to: when the response vector of the to-be-detected video conforms to the second classification rule, determine that the category of the to-be-detected video is the same as that of the video in the sample video library.

The second classification rule is used to detect whether the category of the to-be-detected video is the same as that of the video in the sample video library.

Specifically, the processor 301 may be further configured to acquire at least one component in a response vector of the to-be-detected video, and obtain a main motion phrase according to the at least one component; and configured to acquire and display a key frame of the to-be-detected video.

The main motion phrase is a motion phrase corresponding to at least one component. The key frame has the greatest response to each motion atom unit in the main motion phrase.

In the video classification system provided in this embodiment of the present invention, a video in a sample video library can be segmented to generate motion atoms, motion phrases of the video in the sample video library are generated by using a segmentation result and the motion atoms, the motion phrases are screened and a descriptive vector is generated according to a screening result, and a to-be-detected video whose category is the same as that of the video in the sample video library is determined by using the descriptive vector, thereby achieving an objective of video classification. A main motion phrase may be further obtained according to a component in a response vector of a to-be-detected video, to obtain and display a key frame. Compared with the prior art, the present invention obtains a descriptive vector according to a motion phrase that is used to describe a time sequence relationship between motion atoms of a continuous and complex motion, so that the descriptive vector reflects, in a form of quantized data, motion atoms of a continuous and complex motion that are arranged near a time point according to a time sequence relationship, and are used to detect an extent to which the motion phrase matches a video in a sample video library. Therefore, in a process of performing classification by using a descriptive vector, it is implemented that in the classification process, both a time factor of a video and a motion atom for indicating a specific action and specific content in a video are included, a motion phrase that is used to describe a time sequence relationship between motion atoms of a continuous and complex motion is generated by combining the time factor and the motion phrase, and motion phrases are screened, where a motion phrase in a screening result has desirable representativeness, coverage, and distinguishability, to reduce a quantity of motion phrases that are needed to generate a descriptive vector. In this way, the obtained descriptive vector is simpler, a time taken to generate the descriptive vector is reduced, and a video including a long-time continuous and complex motion can be accurately classified. Meanwhile, a key frame of a to-be-detected video may be further obtained and displayed by using a component in a response vector of the to-be-detected video, and main content of the to-be-detected video is presented clearly and concisely, so that a user can quickly know the main content of the video.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video classification method, comprising:
    segmenting a video in a sample video library according to a time sequence, to obtain a segmentation result having neighboring segments of the video that at least partially overlap in time;
    generating a motion atom set, wherein the sample video library comprises at least one video, and wherein a motion atom in the motion atom set is generated according to the video in the sample video library;
    generating, using the motion atom set and the segmentation result, a motion phrase set corresponding to the video in the sample video library, wherein the motion phrase set comprises at least two motion phrases;
    screening the motion phrases and obtaining a screening result;
    generating, according to the screening result, a descriptive vector corresponding to the video in the sample video library; and
    determining, using the descriptive vector, a to-be-detected video whose category is the same as that of the video in the sample video library.

2. The method according to claim 1, wherein the sample video library comprises at least two videos, and wherein the videos in the sample video library are in a same category.

3. The method according to claim 1, wherein
    a motion phrase of the at least two motion phrases comprises motion atoms that occur in a sequence near time points.

4. The method according to claim 3, wherein a motion phrase in the motion phrase set comprises one motion atom in the motion atom set, and the method further comprises:
    acquiring a motion atom unit $\pi(A,t,\sigma)$; and
    acquiring a representativeness parameter $Rep(P_1,c)$ of a motion phrase according to the motion atom unit, wherein $$Rep(P_1, c) = \frac{\sum_{i \in S(P_1,c)} r(V, P_1)}{|S(P_1, c)|},$$

A is a motion atom, t is a time point in a video in the sample video library, $\sigma$ is a standard deviation of Gaussian distribution, V is a video in the sample video library, $P_1$ is the motion phrase, $r(V,P_1)$ is a response of the motion phrase $P_1$ with respect to the video in the sample video library, $$r(V, P_1) = \min_{OR_i \in P_1} \max_{\pi \in OR_i} v(V, \pi),$$

$$v(V, \pi) = \max_{t' \in \Omega(t)} Score(\Phi(V, t'), A) \cdot N(t' | t, \sigma),$$

wherein $OR_i$ refers to calculation of responses between the video in the sample video library and the motion atom units that are adjacent in time, $S(P_1,c)$ denotes a set of videos, with respect to set of videos, a motion phrase has the greatest response, in the sample video library, c is an identifier of a category of a video in the sample video library, $\Phi(V,t')$ denotes a video feature of a segment result that is in a video in the sample video library and that starts from, t', $Score(\Phi(V,t'),A)$ denotes a score obtained by inputting $\Phi(V,t')$ into a support vector machine (SVM) classifier, $N(t'|t,\sigma)$ denotes Gaussian distribution with a mean t and a standard deviation $\sigma$, and $\Omega(t)$ denotes an adjacent area with a center t;

acquiring a coverage parameter RepSet($\Gamma_1^c$,c) of the motion phrase;

obtaining, according to the coverage parameter RepSet($\Gamma_1^c$,c) of the motion phrase, a contribution value ΔRepSet($P_1$,c), which contributes to the coverage parameter, of the motion phrase, wherein $$RepSet(\Gamma_1^c, c) = \frac{1}{T_c}\left|\bigcup_{P_1 \in \Gamma} S(P_1, c)\right|,$$

wherein ΔRepSet($P_1$,c)=RepSet($\Gamma_1^c$,c)−RepSet($\Gamma_1^c$−{$P_1$},c), $T_c$ is a quantity of segments obtained by segmenting a video whose identifier is c and that is in the sample video library, $\Gamma_1^c$ is the motion phrase set, and an identifier of a category of a video to which the motion atom comprised in the motion phrase belongs is c; and performing the foregoing process for each motion phrase in the motion phrase set; and obtaining a representativeness parameter and a contribution value of each motion phrase in the motion phrase set.

5. The video classification method of claim 4, wherein the screening the motion phrases and the obtaining the screening result comprises:

sorting the motion phrases in the motion phrase set in descending order of values of Rep($P_1$,c)+ΔRepSet($P_1$,c) according to a representativeness parameter and a contribution value of each motion phrase in the motion phrase set, and using first $m_1$ motion phrases as a first screening result, wherein $m_1$ is a positive integer greater than or equal to 1;

extracting one motion atom from the motion atom set to add the motion atom to the motion phrases in the first screening result, so that a motion phrase in the first screening result has two motion atoms;

repeating the foregoing process until an $(n-1)^{th}$ screening result is obtained;

extracting one motion atom from the motion atom set to add the motion atom to motion phrases in the $(n-1)^{th}$ screening result, so that a motion phrase in the $(n-1)^{th}$ screening result has n motion atoms;

obtaining an $n^{th}$ screening result according to the motion phrases in the $(n-1)^{th}$ screening result, wherein the $n^{th}$ screening result is first $m_n$ motion phrases arranged in descending order of values of Rep($P_n$,c)+ΔRepSet($P_n$,c), wherein $m_n$ is a positive integer greater than or equal to 1, a motion phrase in the $n^{th}$ screening result has n motion atoms, and n is a positive integer greater than or equal to 1; and generating the descriptive vector according to the first to $n^{th}$ screening results.

6. The video classification method according to claim 4, wherein the sample video library comprises at least two videos, and the sample video library comprises videos in at least two categories; and wherein the generating the descriptive vector corresponding to the video in the sample video library comprises:

obtaining a screening result set according to screening results of the motion phrases corresponding to the videos in different categories in the sample video library; and generating, according to the screening result set, the descriptive vector corresponding to the videos in the sample video library.

7. The method according to claim 6, wherein the determining the to-be-detected video whose category is the same as that of the video in the sample video library comprises:

generating a response vector corresponding to the to-be-detected video;

acquiring the descriptive vector corresponding to a video in each different category in the sample video library;

obtaining a first classification rule according to the descriptive vector, wherein the first classification rule is used to determine the category to which the to-be-detected video belongs; and determining, according to the first classification rule and the response vector, that the category of the to-be-detected video is the same as a category of the categories of the videos comprised in the sample video library, and classifying the to-be-detected video.

8. The video classification method according to claim 1, wherein the determining the to-be-detected video whose category is the same as that of the video in the sample video library comprises:

generating a response vector corresponding to the to-be-detected video;

obtaining a second classification rule according to a descriptive vector corresponding to each video in the sample video library, wherein the second classification rule is used to detect whether the category of the to-be-detected video is the same as that of the video in the sample video library;

detecting whether the response vector of the to-be-detected video conforms to the second classification rule; and determining that the category of the to-be-detected video is the same as that of the video in the sample video library in response to the response vector of the to-be-detected video conforming to the second classification rule.

9. The video classification method according to claim 1, further comprising:

acquiring at least one component in a response vector of the to-be-detected video, and obtaining a main motion phrase according to the at least one component, wherein the main motion phrase is a motion phrase corresponding to at least one component; and acquiring and displaying a key frame of the to-be-detected video, wherein the key frame has the greatest response to each motion atom unit in the main motion phrase.

10. An apparatus, comprising:

a computer including a non-transitory computer-readable medium storing program modules executable by the computer, the modules including:

a first generation module, configured to segment a video in a sample video library according to a time sequence, to obtain a segmentation result having neighboring segments of the video that at least partially overlap in time, and generate a motion atom set, wherein the sample video library comprises at least one video, and wherein a motion atom in the motion atom set is generated according to the video in the sample video library;

a second generation module, comprising a first generation unit configured to generate, by using the motion atom set and the segmentation result, a motion phrase set corresponding to the video in the sample video library, wherein the motion phrase set comprises at least two motion phrases, the second generation module further comprising a screening unit configured to screen the motion phrases and obtain a screening result, and the second generation module further comprising a second generation unit configured to generate, according to the screening result, a descriptive vector corresponding to the video in the sample video library; and a classification module, configured to determine, by using the descriptive vector, a to-be-detected video whose category is the same as that of the video in the sample video library.

11. The apparatus according to claim 10, wherein the sample video library comprises at least two videos, and the videos in the sample video library are in a same category.

12. The apparatus according to claim 10, wherein a motion phrase of the at least two motion phrases comprises motion atoms that occur in a sequence near time points.

13. The apparatus according to claim 12, wherein a motion phrase in the motion phrase set comprises one motion atom in the motion atom set; and wherein the second generation module further comprises:

a first acquiring unit, configured to acquire a motion atom unit $\pi(A,t,\sigma)$, and acquire a representativeness parameter $Rep(P_1,c)$ of a motion phrase according to the motion atom unit, wherein $$Rep(P_1, c) = \frac{\sum_{i \in S(P_1,c)} r(V, P_1)}{|S(P_1, c)|},$$

A is a motion atom, t is a time point in a video in the sample video library, $\sigma$ is a standard deviation of Gaussian distribution, V is a video in the sample video library, $P_1$ is the motion phrase, $r(V,P_1)$ is a response of the motion phrase $P_1$ with respect to the video in the sample video library, $$r(V, P_1) = \min_{OR_i \in P_1} \max_{\pi \in OR_i} v(V, \pi),$$

$$v(V, \pi) = \max_{t' \in \Omega(t)} \text{Score}(\Phi(V, t'), A) \cdot N(t' \mid t, \sigma),$$

wherein $OR_i$ refers to calculation of responses between the video in the sample video library and the motion atom units that are adjacent in time, $S(P_1,c)$ denotes a set of videos, with respect to which a motion phrase has the greatest response, in the sample video library, c is an identifier of a category of a video in the sample video library, $\Phi(V,t')$ denotes a video feature of a segment result that is in a video in the sample video library and that starts from t', $\text{Score}(\Phi(V,t'),A)$ denotes a score obtained by inputting $\Phi(V,t')$ into a support vector machine SVM classifier, $N(t'|t,\sigma)$ denotes Gaussian distribution with a mean t and a standard deviation $\sigma$, and $\Omega(t)$ denotes an adjacent area with a center t; and a second acquiring unit, configured to acquire a coverage parameter $RepSet(\Gamma_1^c,c)$ of the motion phrase, and obtain, according to the coverage parameter $RepSet(\Gamma_1^c,c)$ of the motion phrase, a contribution value $\Delta RepSet(P_1,c)$, which contributes to the coverage parameter, of the motion phrase, wherein $$RepSet(\Gamma_1^c, c) = \frac{1}{T_c} \left| \bigcup_{P_1 \in \Gamma} S(P_1, c) \right|,$$

$$\Delta RepSet(P_1 c) = RepSet(\Gamma_1^c, c) - RepSet(\Gamma_1^c - \{P_1\}, c),$$

$T_c$ is a quantity of segments obtained by segmenting a video whose identifier is c and that is in the sample video library, $\Gamma_1^c$ is the motion phrase set, and an identifier of a category of a video to which the motion atom comprised in the motion phrase belongs is c;

wherein the foregoing process is performed for each motion phrase in the motion phrase set, and a representativeness parameter and a contribution value of each motion phrase in the motion phrase set are obtained.

14. The apparatus according to claim 13, wherein the screening unit comprises:

a screening subunit, configured to sort the motion phrases in the motion phrase set in descending order of values of $Rep(P_1,c)+\Delta RepSet(P_1,c)$ according to a representativeness parameter and a contribution value of each motion phrase in the motion phrase set, and use first $m_1$ motion phrases as a first screening result, wherein $m_1$ is a positive integer greater than or equal to 1;

an adding subunit, configured to extract one motion atom from the motion atom set to add the motion atom to the motion phrases in the first screening result, so that a motion phrase in the first screening result has two motion atoms, wherein the screening subunit and the adding subunit are continuously executed until an $(n-1)^{th}$ screening result is obtained, one motion atom is extracted from the motion atom set to add the motion atom to motion phrases in the $(n-1)^{th}$ screening result, so that a motion phrase in the $(n-1)^{th}$ screening result has n motion atoms, and an $n^{th}$ screening result is obtained according to the motion phrases in the $(n-1)^{th}$ screening result, wherein the $n^{th}$ screening result is first $m_n$ motion phrases arranged in descending order of values of $Rep(P_n,c)+\Delta RepSet(P_n,c)$, wherein $m_n$ is a positive integer greater than or equal to 1, a motion phrase in the $n^{th}$ screening result has n motion atoms, and n is a positive integer greater than or equal to 1; and a first generation subunit, configured to generate the descriptive vector according to the first to $n^{th}$ screening results.

15. The apparatus according to claim 13, wherein the sample video library comprises at least two videos, and the sample video library comprises videos in at least two categories, wherein the second generation unit comprises:

a set subunit, configured to obtain a screening result set according to screening results of the motion phrases corresponding to the videos in different categories in the sample video library; and a second generation subunit, configured to generate, according to the screening result set, the descriptive vector corresponding to the videos in the sample video library.

16. The apparatus according to claim 15, wherein the classification module comprises:

a third generation unit, configured to generate a response vector corresponding to the to-be-detected video;

a third acquiring unit, configured to acquire the descriptive vector corresponding to a video in each different category in the sample video library, and obtain a first classification rule according to the descriptive vector, wherein the first classification rule is used to determine the category to which the to-be-detected video belongs; and a first classification unit, configured to determine, according to the first classification rule and the response vector, that the category of the to-be-detected video is the same as a category of the categories of the videos comprised in the sample video library, and classify the to-be-detected video.

17. The apparatus according to claim 10, wherein the classification module comprises:
    a fourth generation unit, configured to generate a response vector corresponding to the to-be-detected video;
    a fourth acquiring unit, configured to obtain a second classification rule according to a descriptive vector corresponding to each video in the sample video library, wherein the second classification rule is used to detect whether the category of the to-be-detected video is the same as that of the video in the sample video library;
    a detection unit, configured to detect whether the response vector of the to-be-detected video conforms to the second classification rule; and
    a second classification unit, configured to: when the response vector of the to-be-detected video conforms to the second classification rule, determine that the category of the to-be-detected video is the same as that of the video in the sample video library.

18. The apparatus according to claim 10, further comprising:
    an acquiring module, configured to acquire at least one component in a response vector of the to-be-detected video, and obtain a main motion phrase according to the at least one component, wherein the main motion phrase is a motion phrase corresponding to at least one component; and
    a display module, configured to acquire and display a key frame of the to-be-detected video, wherein the key frame has the greatest response to each motion atom unit in the main motion phrase.

19. An apparatus, comprising:
    a processor; and
    a non-transitory computer-readable storage medium storing a program to be executed by the processor, the program including instructions for:
        segmenting a video in a sample video library according to a time sequence, to obtain a segmentation result having neighboring segments of the video that at least partially overlap in time;
        generating a motion atom set, wherein the sample video library comprises at least one video, and wherein a motion atom in the motion atom set is generated according to the video in the sample video library;
        generating, using the motion atom set and the segmentation result, a motion phrase set corresponding to the video in the sample video library, wherein the motion phrase set comprises at least two motion phrases;
        screening the motion phrases and obtaining a screening result;
        generating, according to the screening result, a descriptive vector corresponding to the video in the sample video library; and
        determining, using the descriptive vector, a to-be-detected video whose category is the same as that of the video in the sample video library.

20. The apparatus according to claim 19, wherein the instructions for determining the to-be-detected video whose category is the same as that of the video in the sample video library comprise instructions for:
    generating a response vector corresponding to the to-be-detected video;
    obtaining a second classification rule according to a descriptive vector corresponding to each video in the sample video library, wherein the second classification rule is used to detect whether the category of the to-be-detected video is the same as that of the video in the sample video library;
    detecting whether the response vector of the to-be-detected video conforms to the second classification rule; and
    determining that the category of the to-be-detected video is the same as that of the video in the sample video library in response to the response vector of the to-be-detected video conforming to the second classification rule.

* * * * *